(12) United States Patent
Yamazaki et al.

(10) Patent No.: US 6,483,075 B1
(45) Date of Patent: Nov. 19, 2002

(54) THREE DIMENSIONAL LINEAR MACHINING APPARATUS

(75) Inventors: Tsunehiko Yamazaki, Nagoya; Naoomi Miyakawa, Gifu, both of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 09/613,939

(22) Filed: Jul. 11, 2000

(30) Foreign Application Priority Data

| Jul. 16, 1999 | (JP) | 11-203785 |
| Sep. 30, 1999 | (JP) | 11-280393 |
| Oct. 22, 1999 | (JP) | 11-301098 |
| Oct. 22, 1999 | (JP) | 11-301209 |

(51) Int. Cl.[7] .......................... B23K 26/02; B23K 26/00
(52) U.S. Cl. .................. 219/121.82; 219/121.6
(58) Field of Search .................. 219/121.82, 121.6, 219/121.67

(56) References Cited

U.S. PATENT DOCUMENTS

| 4,434,349 | A | * | 2/1984 | Tsutsumi | 219/121 LG |
| 5,183,993 | A | * | 2/1993 | Sato et al. | 219/121.82 |
| 5,192,848 | A | * | 3/1993 | Miyakawa et al. | 219/121.82 |
| 5,334,816 | A | * | 8/1994 | Sugiyama | 219/121.83 |
| 5,373,136 | A | * | 12/1994 | Ernst et al. | 219/121.67 |
| 5,660,748 | A | * | 8/1997 | Tanaka et al. | 219/121.84 |
| 5,986,236 | A | * | 11/1999 | Gainand et al. | 219/121.82 |
| 6,020,573 | A | * | 2/2000 | Chabatake | 219/121.82 |

FOREIGN PATENT DOCUMENTS

| DE | 0 705 655 A1 | 4/1996 |
| DE | 197 21 330 A | 11/1997 |

* cited by examiner

*Primary Examiner*—M. Alexandra Elve
*Assistant Examiner*—Zidia Pittman
(74) *Attorney, Agent, or Firm*—Wolf, Block, Schorr and Solis-Cohen LLP; Richard P. Gilly

(57) ABSTRACT

A first and a second long-length member holding means 13, 39 are provided, and the second long-length member holding means 39 is provided on the side of a machining head portion 32 rather than the first long-length member holding means 13. A through hole 14c, capable of penetrate a long-length member 53, is formed on the second long-length member holding means 39. The first and second long-length member holding means are provided so as to be relatively close to and relatively apart from each other in a first direction. By moving and approaching the long-length member 53 in the second long-length member holding means 39 direction, while being held with the first long-length member holding means 13, the long-length member 53 is projected optional quantity on the machining head portion 32 side from the second long-length member holding means 39. Then, three-dimensional linear machining is performed on the long-length member 53 by the machining head 36. Therefore, free curved face cutting machining can be successively performed on a long-length member, then mass production machining is made easy.

20 Claims, 15 Drawing Sheets

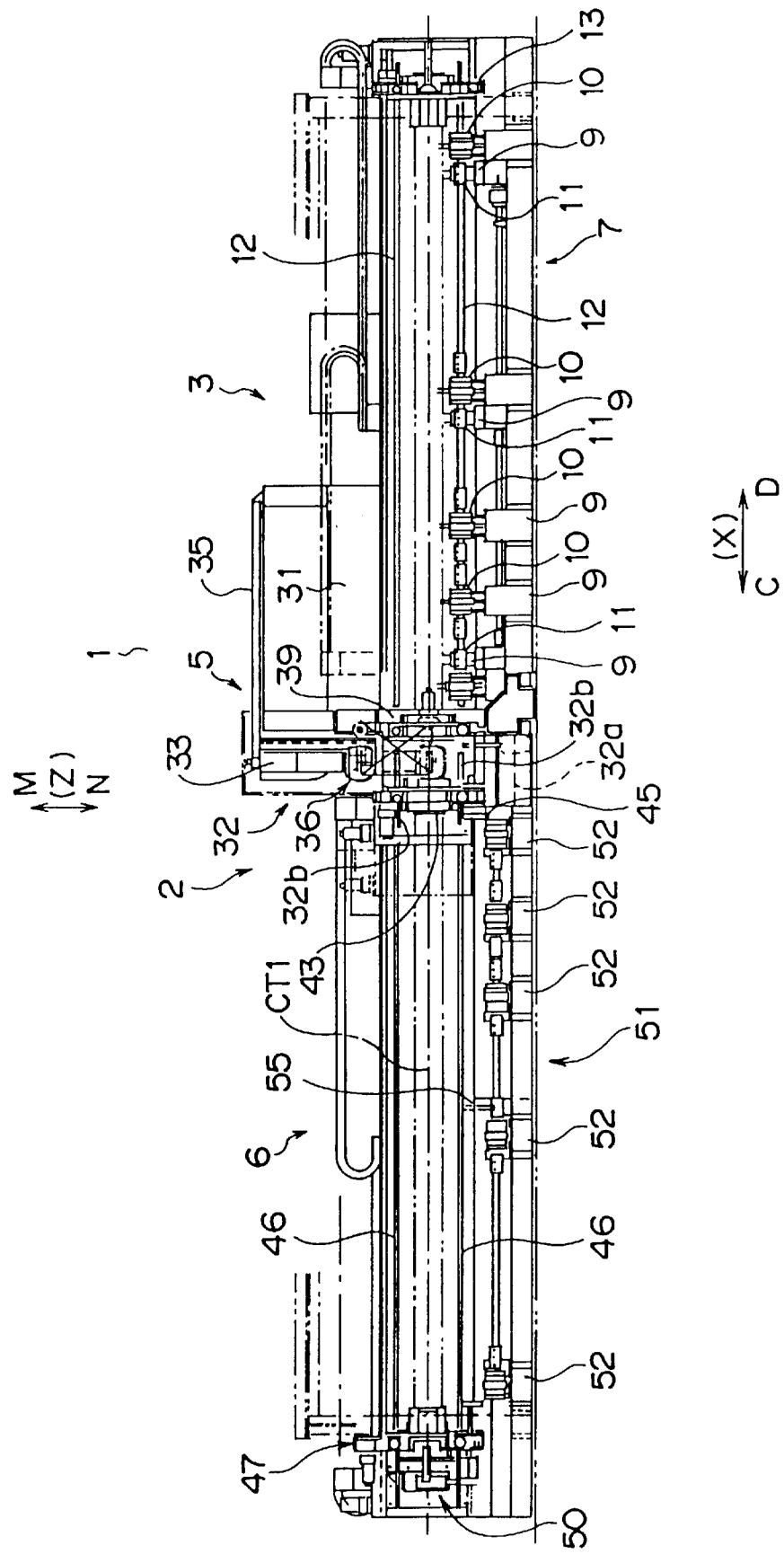

F I G. 1 3
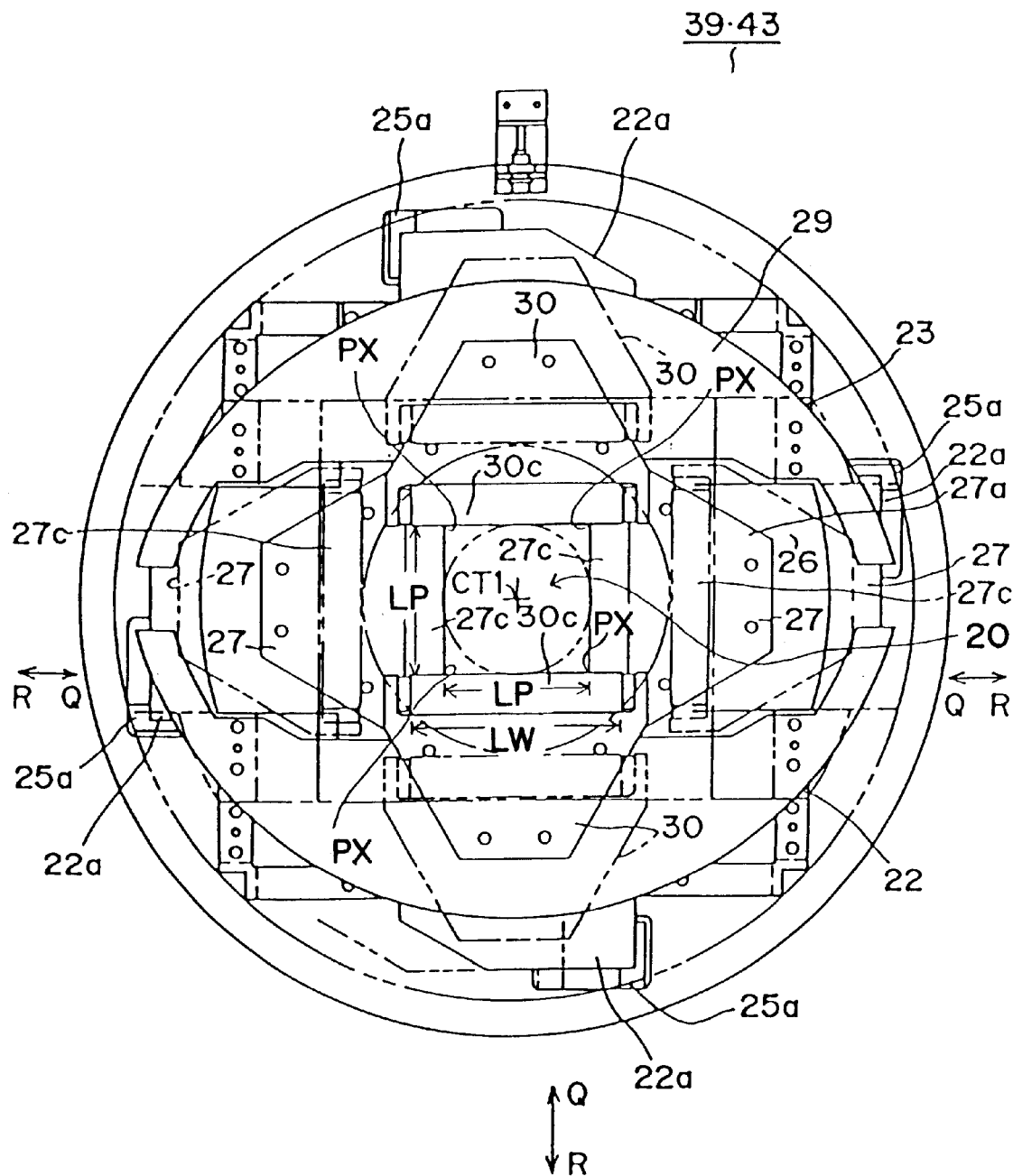

F I G. 1 4
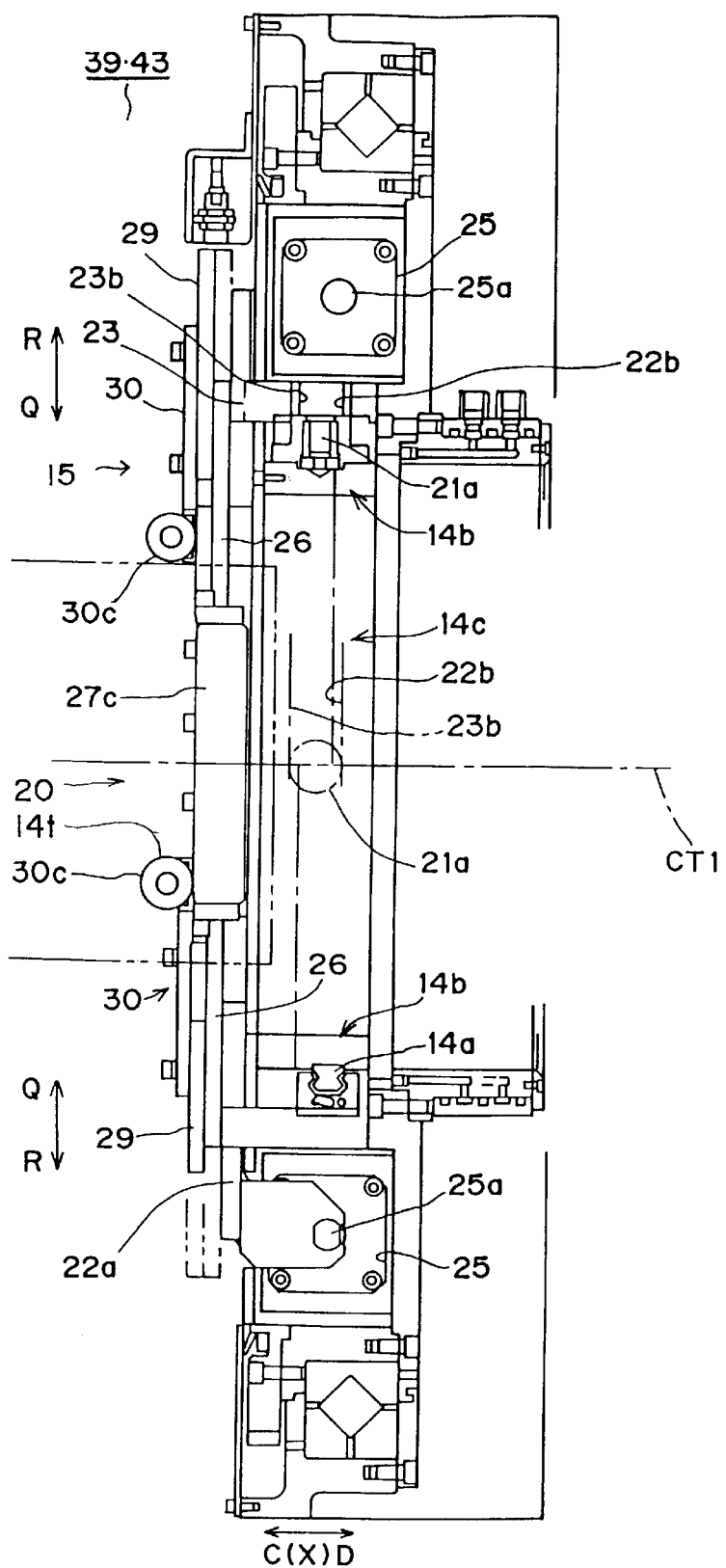

THREE DIMENSIONAL LINEAR MACHINING APPARATUS

BACKGROUND OF THE INVENTION

The present invention relates to a three-dimensional linear machining apparatus capable of linear cutting on a so-called long-length member, such as a pipe and an angle, having free-curved face shape, by plasma cutting, gas cutting and laser beam cutting. Besides, the present invention relates to a clamping apparatus for a machine tool, capable of properly clamping workpieces having various kinds of sectional shapes, such as a pipe and an angle, at the time of machining with a machine tool. Besides, the present invention relates to a raw material feeding apparatus capable of properly feeding machining raw material in a machine tool, such as a laser beam machine, and a linear machining apparatus having this raw material feeding apparatus.

In recent years, a linear machining apparatus capable of cutting machining on a workpiece in the shape of a cylinder has been proposed. In case where free-curved face machining is possible on a long-length member, such as a pipe and an angle, various kinds of uses including for architecture are thinkable. But, there was no apparatus capable of successively performing laser beam cutting on a long-length member in the past, and mass production was difficult.

Then, the object of the present invention is to provide a three-dimensional linear machining apparatus capable of successively performing free-curved face cutting machining on a long-length member and easily performing mass production machining, taking the above-mentioned circumstances into consideration.

Besides, various kinds of shapes of workpieces have been machined by a machine tool, such as plasma cutting, gas cutting and laser beam cutting in the past. In such a machining, machining may be performed, clamping a workpiece by a proper clamping apparatus. But, the workpiece, such as a pipe and an angle, may have so-called modified cross sectional shape, such as L-shape, I-shape, and H-shape, in addition to round shape. But, in the past a method of properly clamping the workpiece having this modified cross sectional shape has not been established.

Then, the object of this invention is to provide a clamping apparatus for a machine tool, capable of also properly clamping the workpiece having modified cross sectional shape, taking the above-mentioned circumstances into consideration.

Besides, machining has been performed by a linear machining apparatus, such as plasma cutting, gas cutting and laser beam cutting in the past. But, a method of properly automatically feeding a long-length machining raw material with such an apparatus has not yet been established.

Then, the object of the present invention is to provide a raw material feeding apparatus capable of properly feeding long-length machining raw material and a linear processing apparatus having this raw material feeding apparatus, taking the above-mentioned circumstances into consideration.

SUMMARY OF THE INVENTION

In order to solve the above-mentioned problems, three dimensional linear machining apparatus having a machining head portion providing a machining head capable of linearly machining a long-length member along its free curved face form, and a first raw material feeding apparatus for feeding a long-length member in a first direction to said machining head portion, said three-dimensional linear machining apparatus performing a three-dimensional linear machining on a long-length member supplied said machining head portion by said raw material feeding apparatus on the basis of a machining program, said three dimensional linear machining apparatus further comprising:

said first raw material feeding apparatus having a first and a second long-length member holding means;

a holding portion for fixedly holding said long-length member in said first direction provided with said first long-length member holding means;

said second long-length member holding means provided on said machining head portion side rather than said first long-length member holding means;

a through hole through which said long-length member can pass and a holding portion for movably holding said long-length member in said first direction, both formed on said second long-length member holding means; and said first and second long-length member holding means provided free to be relatively close to and be relatively apart from each other in said first direction.

Then, the long-length workpiece is moved and approached in the second long-length member holding means direction, holding by the first long-length member holding means so as to project the long-length member optional quantity from the second long-length member holding means on the machining head portion side. Then, a three-dimensional linear machining can be smoothly performed on the long-length member by the machining head. Besides, the three-dimensional linear machining can be successively performed on the long-length member by relatively moving the first long-length member holding means in the first direction every machining with the machining head. Then, the three-dimensional linear machining apparatus capable of easily performing mass production machining can be provided.

Besides, in the three-dimensional linear machining apparatus, a second raw material feeding apparatus is provided on the opposite side of said first raw material feeding apparatus of said machining head portion, said second raw material feeding apparatus has a third and a fourth long-length member holding means, said third long-length member holding means is provided on said machining head portion side rather than said fourth long-length member holding means, a through hole through which said long-length member can pass and a holding portion for movably holding said long-length member in said first direction are formed on said third long-length member holding means, a holding portion for fixedly holding said long-length member in said first direction is provided with said fourth long-length member holding means, and said third and fourth long-length member holding means are provided free to be relatively close to and be relatively apart from each other in said first direction.

Then, the long-length member can be machined, holding by the third and the fourth long-length member holding means in the state of placing the machining head therebetween. Therefore, occurrence of bending of the long-length member at the time of machining can be prevented and accurate machining is possible. Besides, by synchronously moving and driving in the first direction interlocking with the first and the second long-length member holding means, various kinds of machining can be performed on the long-length member. Then, high machining efficiency can be exercised.

Besides, in the present invention, said long-length member holding means is rotatably and drivably provided in such a state that said holding portion can be controlled in its rotational angle, and can be rotated and driven in such a state that said long-length member is held by said holding portion.

Then, three-dimensional machining can be easily performed on the long-length member by rotating the holding portion while its rotational angle being controlled.

Besides, in the present invention, said holding portion is provided so as to rotate and drive, synchronizing with said holding portion of another long-length member holding means.

Then, the machining with rotational angle control can be correctly and easily performed on the long-length member by rotating and driving the holding portion, synchronizing with the holding portion of another long-length member holding means.

Besides, in the present invention, a member centering means is provided with said holding portion.

Then, automatic centering is possible by holding the long-length member with the member centering means.

Then, in the present invention, said first long-length member holding means is provided being free to move, drive and position in said first direction and said second long-length member holding means is fixed with respect to said machining head.

Then, since the second long-length member holding means can be located at the position near the machining head portion where machining is performed, the machining portion of the long-length member can be certainly held at its near portion. Therefore, machining efficiency can be improved.

Besides, the three-dimensional linear machining apparatus may be a laser beam machine, a plasma cutting machine or a gas cutting machine.

Then, various kinds of machines can be used as the three-dimensional linear machining apparatus.

Besides, in the present invention, said second and third long-length member holding means are provided so as to be relatively close to and relatively apart from each other in said first direction, and said holding portions of both can abut on each other at the time both are the most close to each other.

Then, by abutting the holding portions of the second and the third long-length member holding means on each other, the top end portion of the long-length member held on the second long-length member holding means side can be held with minimum projected length by the third long-length member holding means. Even if the long-length member is shortly cut in the first direction and then, the end portion is machined, holding the cut workpiece on the third long-length member holding means side, the workpiece can be certainly held.

Besides, in the present invention, the holding portion of said first long-length member holding means is formed so as to insert into a through hole of said second long-length member holding means, and the holding portion of the fourth long-length member holding means is formed so as to insert into a through hole of said third long-length member holding means.

Then, the first, the second, the third and the fourth long-length member holding means can be extremely approached one another without interfering with the holding portions of the first and the fourth long-length member holding means. Therefore, the portion to be held by machining can be made minimum, and the machining is possible, strictly restricting vain cut remaining portion. Then, the yield of material can be improved.

Besides, in the present invention, said first and said fourth long-length member holding means are provided being free to synchronously move and drive in said first direction.

Then, the long-length member can be machined, synchronously moving in the first direction in the state of being held by the first and the fourth long-length member holding means, and correct machining is possible, holding the long-length member without bending.

Besides, in the present invention, said first and said second long-length member holding means are provided being free to move, drive and position in said first direction.

Then, more advanced complex machining is possible by individually moving and driving the first and the second long-length member holding means since the first and the second long-length member holding means are provided being free to move, drive and position in the first direction.

Besides, clamping apparatus for a machine tool which is a clamping apparatus for clamping a workpiece when said workpiece is machined with a machine tool, having an apparatus body, a workpiece insertion portion capable of inserting a workpiece in an axial center direction of said apparatus body formed on said apparatus body, and three or more clamping members provided at the periphery of said workpiece insertion portion so as to synchronously move in a radial direction through a synchronous movement mechanism, and a workpiece abutting portion formed on said each clamping member, facing said workpiece insertion portion, said clamping apparatus for a machine tool further comprising:

said workpiece abutting portion formed such that projected form parallel to said axial center direction becomes to be substantially straight line;

said clamping members adjacent to each other located so as to cross such that said projected forms parallel to said axial center direction of these workpiece abutting portions form an intersectional portion by shifting said workpiece abutting portions in said axial center direction; and said each workpiece abutting portion located so as to move to such a position that the distance between said intersectional portions formed on both sides of said workpiece abutting portion in the projected form parallel to said axial center direction is smaller than the width of said workpiece abutting portion.

Then, the respective workpiece abutting portions can move to the position where the distance between the intersectional portions formed on both sides of the workpiece abutting portions is smaller than the width of the workpiece abutting portions in the projected form parallel to the axial center direction. So, the projected form parallel to the axial center direction forms a closed ring, and a plurality of workpiece abutting portions can move, being free to enlarge and reduce the size of this closed ring. That is, the workpiece inserted into the workpiece insertion portion is enclosed by the closed ring with a plurality of workpiece abutting portions. Even if it has modified cross section shape, the closed ring enclosing the workpiece is reduced so as to always make stable clamping condition with three or more points. That is, according to the present invention, the workpiece having modified cross sectional shape can be also properly clamped.

Besides, in the present invention, a plurality of said clamping members are formed such that the projected forms parallel to said axial center direction of said workpiece abutting portions are almost the same dimension.

Then, since the projected forms parallel to the axial center direction of the respective workpiece abutting portions are almost the same dimension, it is convenient when a general workpiece which section is a circle or a square is clamped, in addition to the modified cross section, and it is used for various purposes.

Besides, in the present invention, even-numbered clamping means are provided and these clamping members are symmetrically located through said workpiece insertion portion.

Then, stable clamping is realized since a workpiece is clamped, holding by the clamping member located facing each other. Besides, it is advantageous for shifted location in the axial center direction of the workpiece abutting portion since even-numbered clamping members are provided.

Besides, in the present invention, said workpiece abutting portion is a claw portion formed, projecting for said workpiece insertion portion.

Then, the workpiece can be fixed so as not to move in the axial center direction by the claw portion.

Besides, in the present invention, said workpiece abutting portion is formed by a rotatable roller.

Then, the workpiece can be movably clamped in the axial center direction by the roller.

Besides, in the present invention, said clamping member is comprised of a first member on said apparatus body side and a second member formed said workpiece abutting portion, and said second member is attachable to and detachable from said first member.

Then, if a plurality of kinds of the second members where the width of the workpiece abutting portion and projected quantity are different are prepared, the clamping apparatus can be used, changing the second member in proper kinds by properly attaching to and detaching from the first member according to the shape of a workpiece to be clamped. By doing so, this clamping apparatus can clamp the workpieces having various kinds of shapes.

Besides, in the present invention, a driving means for moving and driving said clamping members through said synchronizing movement mechanism is provided, and said driving means has a function of maintaining a constant sized driving force.

Then, damage is not given to the workpiece by an unpremeditated big force especially in case of the workpiece having modified cross section since the driving means has a function of maintaining constant sized driving force.

Besides, in the present invention, said plurality of clamping members are synchronously movable through said synchronizing movement mechanism every pair of the clamping members facing through said workpiece insertion portion.

Then, the shape of the closed ring formed by a plurality of workpiece abutting portions can be properly adjusted, fitting to the shape of the workpiece to be clamped, especially in case of the workpiece having modified cross section since the clamping members are synchronously moved every pair.

Besides, in the present invention, a driving means for moving and driving these clamping members every pair of said clamping members through said synchronizing movement mechanism is provided, and said each driving means has a function of maintaining constant sized driving force.

Then, damage is not given to the workpiece by an unpremeditatedly big force especially in case of the workpiece having modified cross section since the workpiece can be clamped in any abutting portion with constant force, so clamping is possible with stable force.

Besides, in the present invention, raw material feeding apparatus for feeding machining raw material in the feeding direction, comprising:

a raw material holding means set having a first raw material holding means and a second raw material holding means, both located in said feeding direction;

said first raw material holding means having a first holding portion for fixedly holding said machining raw material in said feeding direction;

said second raw material holding means having a through hole formed so as to penetrate said machining raw material and a second holding portion for movably holding said machining raw material in said feeding direction; and said first and said second raw material holding means provided so as to be relatively close to and relatively apart from each other in said feeding direction.

Then, when machining raw material is fed, one end of the machining raw material is fixedly held by the first raw material holding means and the position near the center of the machining raw material is movably (guided) supported by the second raw material holding means. By doing so, automatic feeding of the machining raw material can be properly performed without bending by its dead weight.

Besides, in the present invention, two sets of said raw material holding means sets are provided in said feeding direction, and these raw material holding means sets are symmetrically located in said feeding direction by facing the sides of said second raw material holding means each other.

Then, automatic feeding of the machining raw material can be properly performed without bending by its dead weight in spite of feeding quantity of the machining raw material fed from one raw material holding means set since the machining raw material can be fed, delivering between the two sets of the raw material holding means sets.

Besides, in the present invention, said first holding portion is formed in a claw shape, and said second holding portion is a rotatable roller.

Then, the machining raw material can be certainly fixed so as not to move in the feeding direction by the first holding portion formed in the claw shape, and the machining raw material can be smoothly moved in the feeding direction by the second holding portion formed by a roller.

Besides, in the present invention, said two first holding portions are rotatably and drivably provided, being synchronous in such a state that rotational angle can be controlled in said two sets of raw material holding means sets.

Then, three-dimensional machining can be easily performed on the long-length machining raw material by rotating two first holding portions with rotational angle control.

Besides, in the present invention, a machining raw material supply means, capable of supplying a machining raw material between said first raw material holding means and said second raw material holding means in a direction intersecting with said feeding direction, is provided with said raw material holding means set.

Then, since the machining raw material is supplied the raw material holding means set in the direction crossing the feeding direction by the machining raw material supplying means, work space at the time of supplying the raw material can be saved without supplying the long-length machining raw material from the upper stream side of the feeding direction of the raw material holding means set, for instance.

Besides, in the present invention, raw material feeding apparatus for feeding machining raw material in a feeding direction, comprising:

a raw material holding means set having a first raw material holding means and a second raw material holding means, both located in said feeding direction;

said first raw material holding means having a first holding means body, and a first holding portion, formed projecting on said second raw material holding means side with respect to said first holding means body, for fixedly holding said machining raw material in said feeding direction;

said second raw material holding means having a second holding means body, a through hole capable of inserting said first holding portion, formed on said second holding means body so as to penetrate, and a second holding portion for movably holding said machining raw material in said feeding direction; and said first and second raw material holding means provided so as to be relatively close to and relatively apart from each other in said feeding direction.

Then, when the long-length machining raw material is fed, one end of the machining raw material is fixedly held by the first raw material holding means and the position near the center of the machining raw material is movably (guided) supported by the second raw material holding means. By doing so, automatic feeding of the machining raw material can be properly performed without bending by its dead weight. Besides, since the first holding portion can be inserted into the through hole, one end of the machining raw material held by the first holding portion can be inserted into this through hole, the utmost end portion can be also fed in the feeding direction. Then, the portion which can not be machined by holding is few, and the yield improves.

Besides, in the present invention, said second holding portion is located near an opening of the back side of said first raw material holding means of said through hole.

Then, since one end of the machining raw material held by the first holding portion can be fed near the opening of the through hole in the feeding direction, the portion which can not be machined by holding is few, and the yield improves.

Besides, in the present invention, said first holding portion is formed so as to be adjacent to said second holding portion in said feeding direction at the time of insertion into said through hole.

Then, since one end of the machining raw material held by the first holding portion can be fed to the position adjacent to the second holding portion in the feeding direction, the portion which can not be machined by holding is few, and the yield improves.

Besides, in the present invention, said first holding portion is formed in a claw shape, and said second holding portion is rotatable roller.

Then, the machining raw material can be certainly fixed so as not to move in the feeding direction by the first holding portion formed in the claw shape, and the machining raw material can be smoothly moved in the feeding direction by the second holding portion formed by a roller.

Besides, in the present invention, two sets of said raw material holding means sets are provided in said feeding direction, and the sides of said second raw material holding means are located, facing each other.

Then, the longer-length machining raw material can be also properly supported and fed by the two sets of the raw material holding means sets between the two raw material holding means sets.

Besides, in the present invention, said linear machining apparatus further comprises said raw material feeding apparatus, a machining means capable of linearly machining on the machining raw material fed in the feeding direction by the raw material feeding apparatus.

Then, the linear machining apparatus exercising the same effects as the above-mentioned invention is provided. So, machining automation of the long-length machining raw material can be realized, and it's very convenient.

BRIEF DESCRIPTION OF THE DRAWINGS

Embodiments of this invention will now be explained based on the drawings.

FIG. 1 is a front elevation showing the whole of a laser beam machine which is an example of a three-dimensional linear machining apparatus;

FIG. 13 is a front elevation of the second and the third chuck units;

FIG. 14 is a side-view of the second and the third chuck units;

DESCRIPTION OF THE PREFERRED EMBODIMENT

Figure 2:
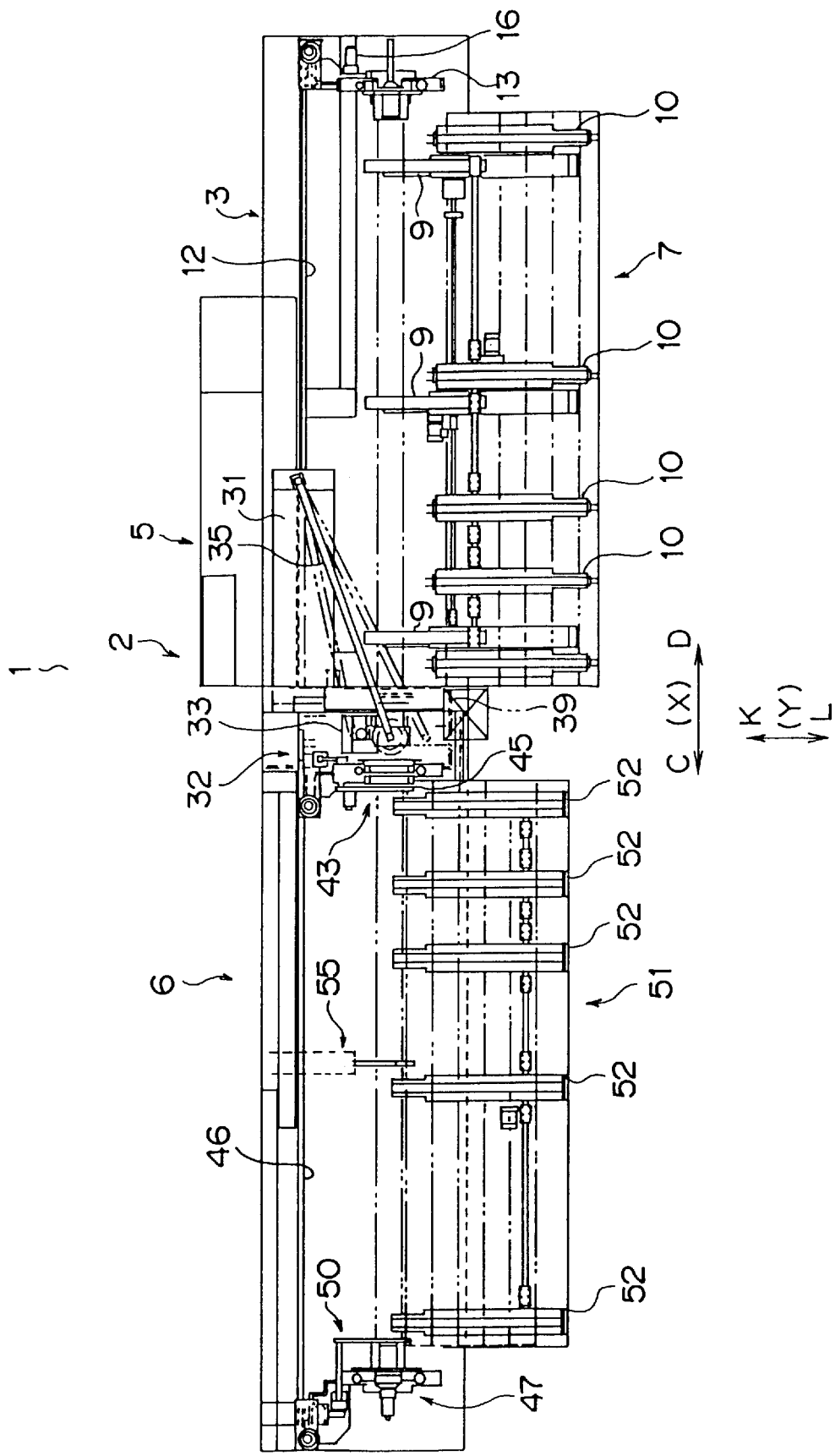
FIG. 2 is a plan in the laser beam machine of FIG. 1.
Figure 7:
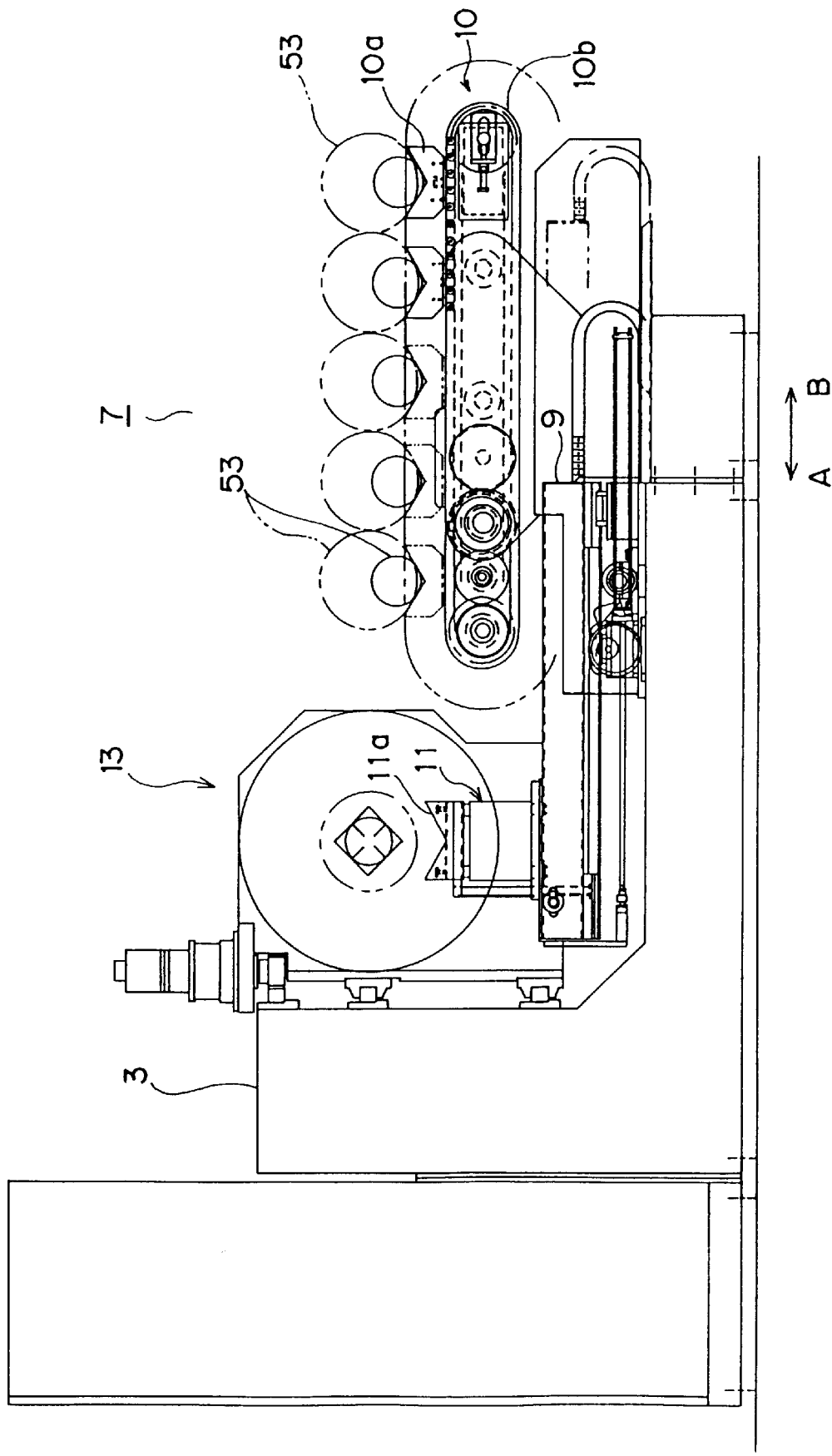
FIG. 7 is a side-view of a carrying-in conveyor part in the laser beam machine of FIG. 1.

A laser beam machine 1, which is a three-dimensional linear machining apparatus, has a machine body 2 extending in the right and left direction in the figure, as shown in FIGS. 1 and 2. And, a front workpiece feeder 3, a machining portion 5 and a rear workpiece feeder 6 are placed on the machine body 2 in order from the right side in the figure. The front workpiece feeder 3 has a workpiece stock unit 7, and a workpiece stock unit 7 stocks so-called long-length members such as a pipe and an angle material, in which the same section continues in the axial center direction of the member, and supplies 1 by 1. The workpiece stock unit 7 has a plurality of conveyer units 10 provided with the machine body 2, as shown in FIGS. 2 and 7. With the conveyer unit 10, an endless chain 10b is provided, rotatable synchronously among the conveyor units 10. A plurality of workpiece supports 10a are placed at each chain 10b at a predetermined interval.

Figure 19:
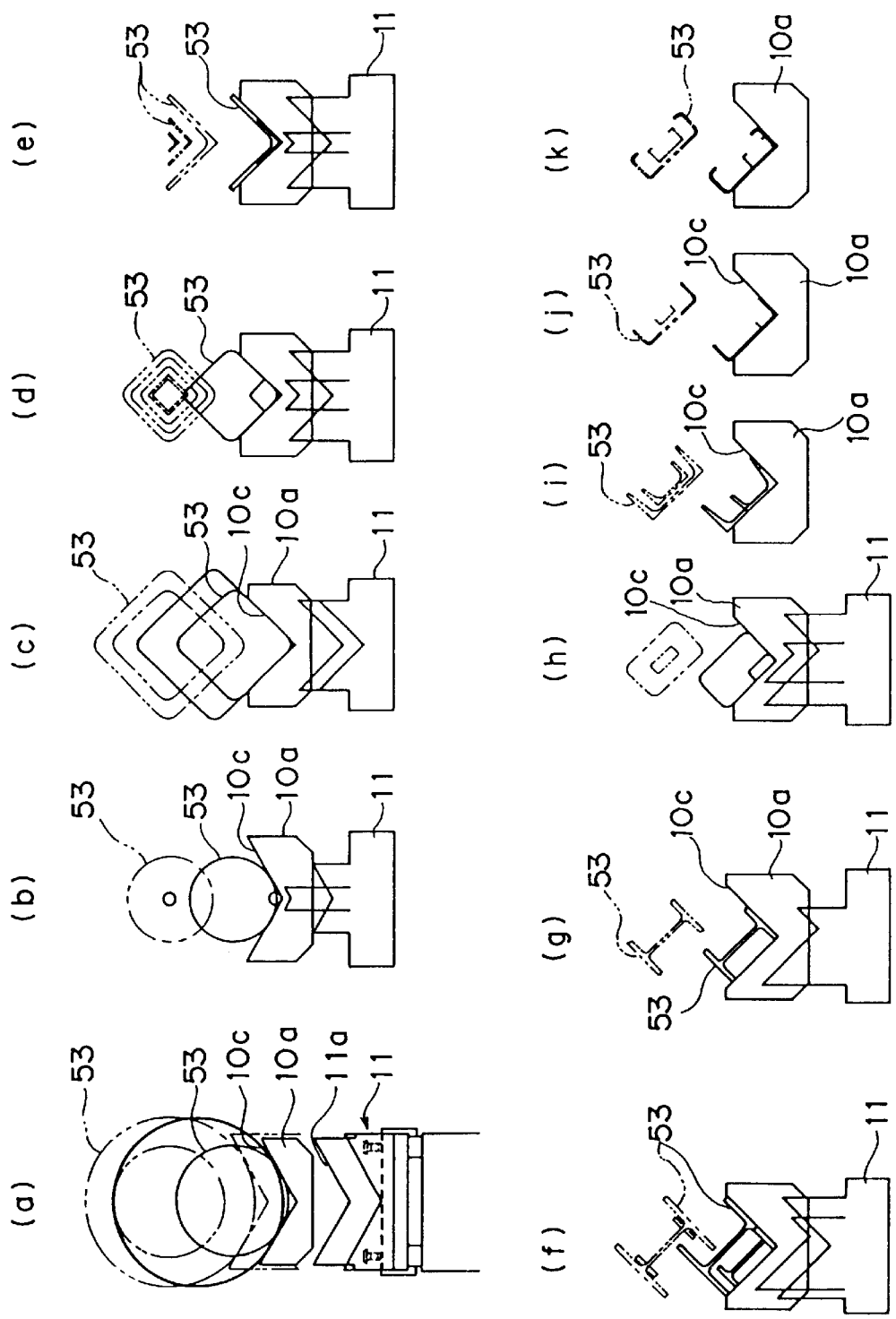
FIG. 19 is a side-view showing an example of a workpiece support for loading various kinds of long-length workpieces.

As shown in FIG. 19, a plurality of kinds of the workpiece supports 10a are prepared according to the shapes of the sections of various kinds of the long-length members which can be machined with the laser beam machine 1. These workpiece supports 10a are provided with the chain 10b, being free to attach and detach and exchange. As shown in FIG. 19, a member loading portion 10c is provided with each workpiece support 10a so as to load the long-length members having various kinds of sectional shapes, such as a circle, a quadrangle, an H-shape, an L-shape and a C-shape, corresponding to each member. The workpiece support 10a is installed on the chain 10b according to the member to be machined with the laser beam machine 1 and the corresponding long-length member is loaded on the installed workpiece support 10a.

On the left hand in FIG. 7 of the workpiece stock unit 7, a plurality of movable carriages 9 are provided, synchronously movable and drivable in the direction as shown by the arrows A and B in FIG. 7 on the machine body 2. A workpiece delivery unit 11 is provided with each movable carriage 9 on the left edge portion of each movable carriage 9 in the figure. A workpiece loading portion 11a, attachably and detachably provided, is provided with the workpiece delivery unit 11, being free to synchronously go up and down and drive among the workpiece delivery units 11.

Guide rails 12, 12 are placed on the machine body 2 on the upper hand of FIG. 2 of the workpiece stock unit 7 of the front workpiece feeder 3 in the direction as shown by the arrows C and D which is X-axis direction. A first chuck unit 13 is provided on the guide rails 12, 12, movable and drivable in the direction as shown by the arrows C and D on the machine body 2 along the guide rails 12, 12.

Figure 3:
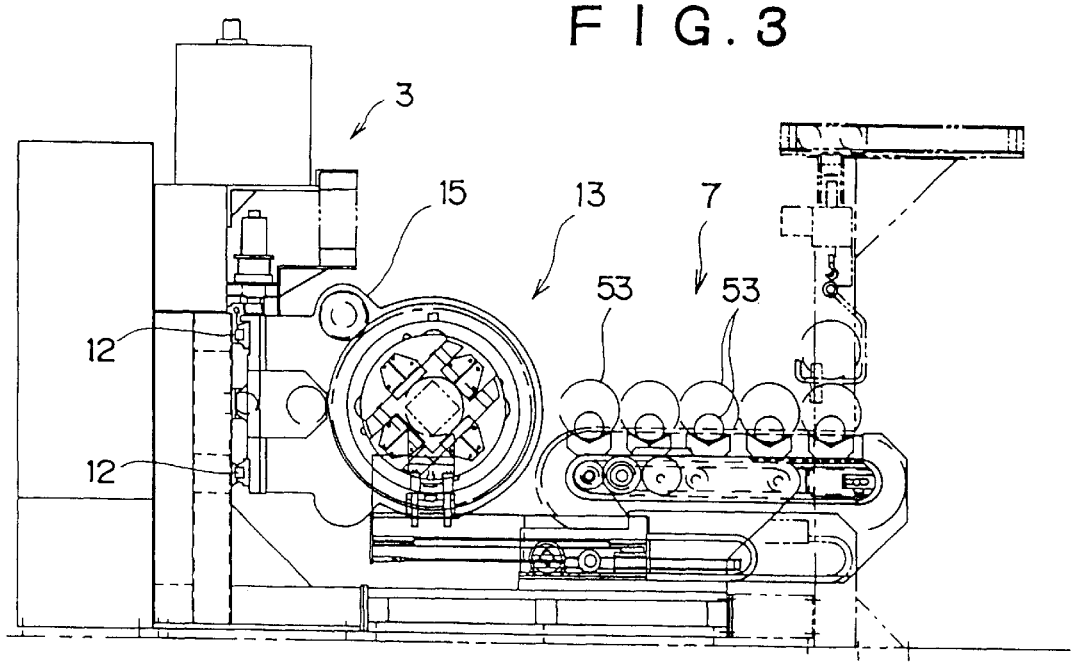
FIG. 3 is a side-view showing near a first chuck unit in the laser beam machine of FIG. 1.
Figure 15:
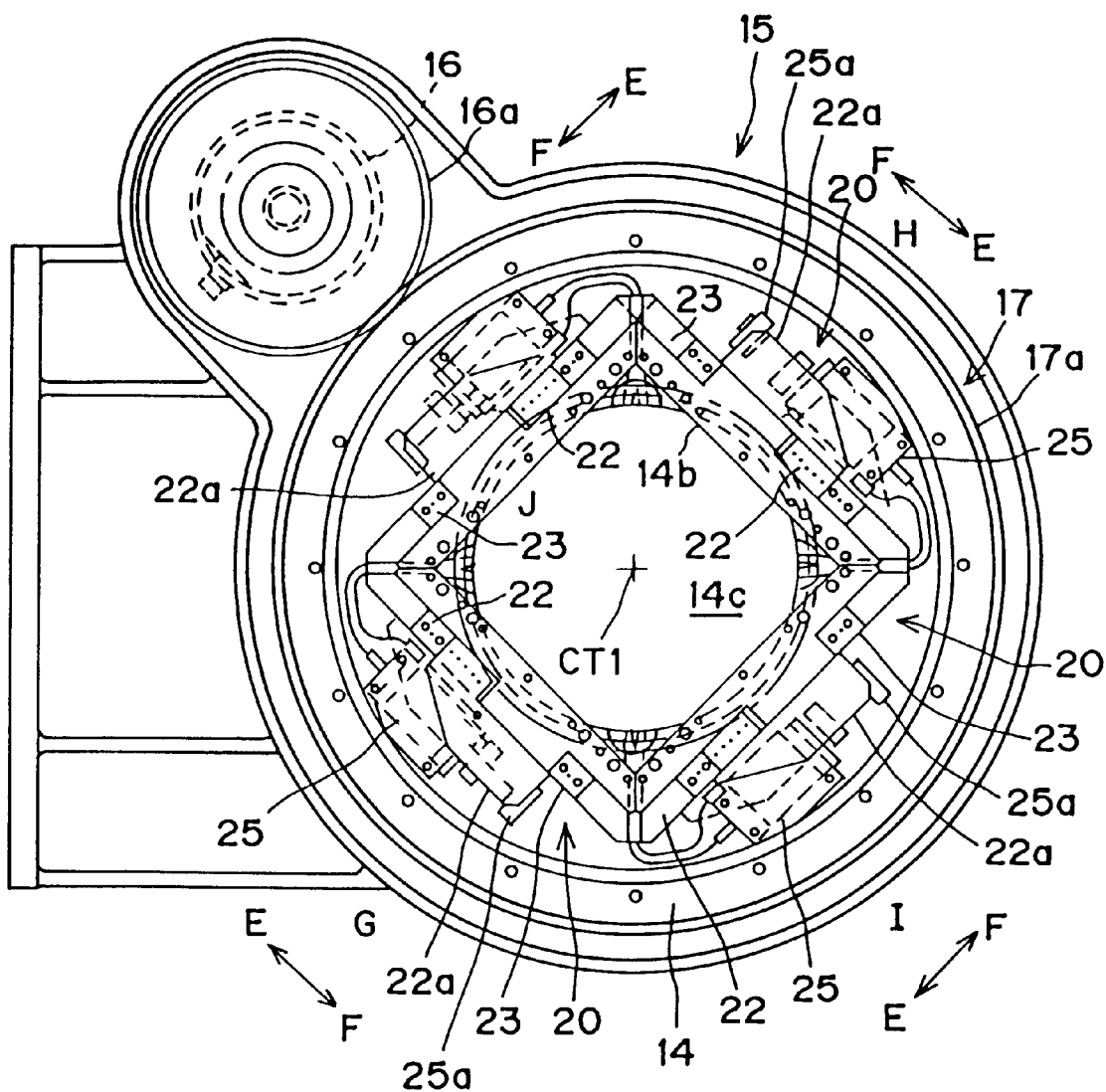
FIG. 15 is a front elevation showing a claw switching drive portion of the chuck unit.
Figure 18:
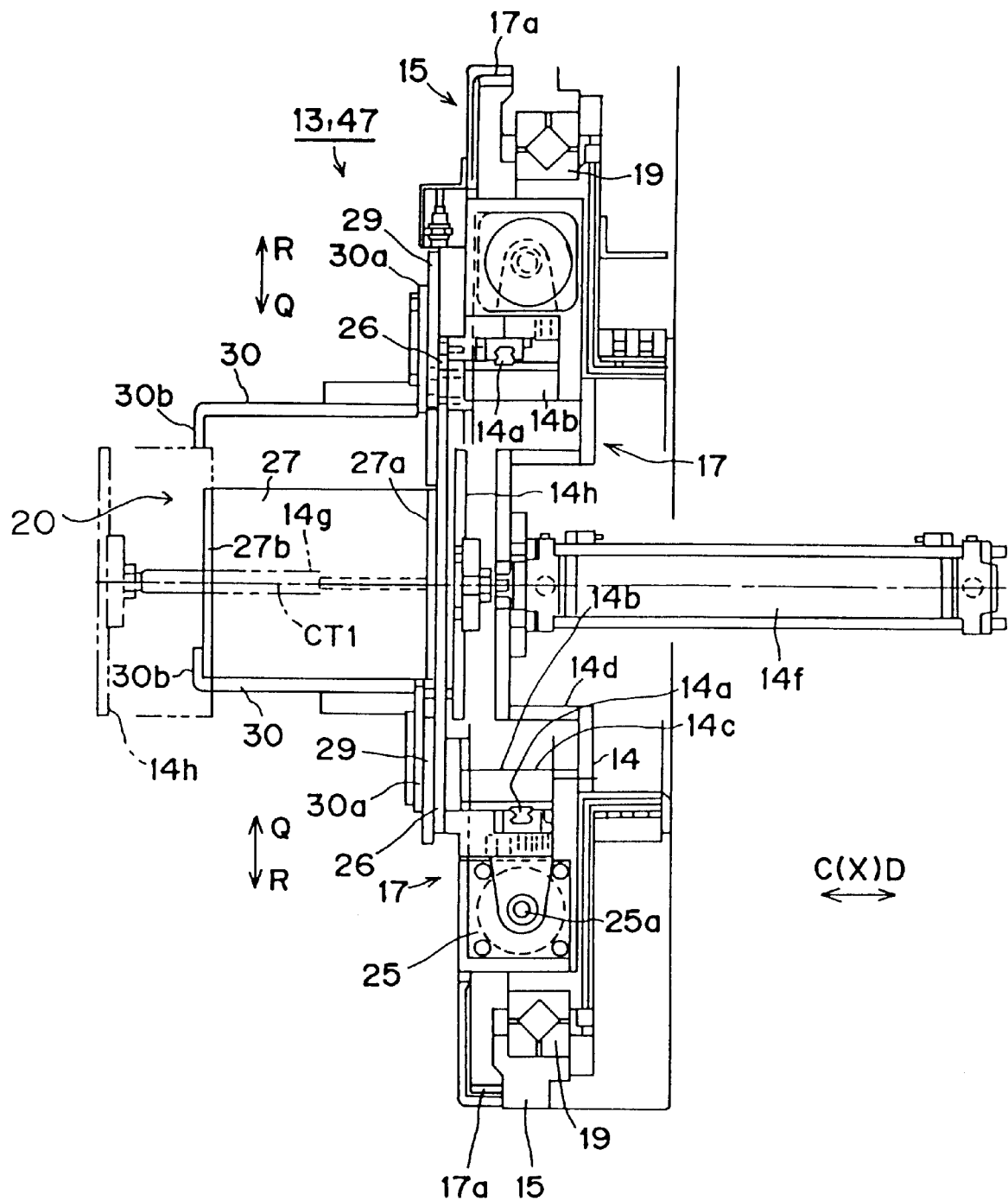
FIG. 18 is a side-view of FIG. 17.

As shown in FIG. 3, the first chuck unit 13 has a main body 15 suspended by the guide rail 12, and a driving motor 16 installing a gear 16a thereon is provided with the main body 15, as shown in FIG. 15. A rotation head 17, rotatably and drivably supported by the main body 15 with the central axis CT1 as its center, is engaged with the driving motor 16 through a gear 17a located on the outer peripheral portion of the rotation head 17, as shown in FIG. 15 and FIG. 18.

Figure 16:
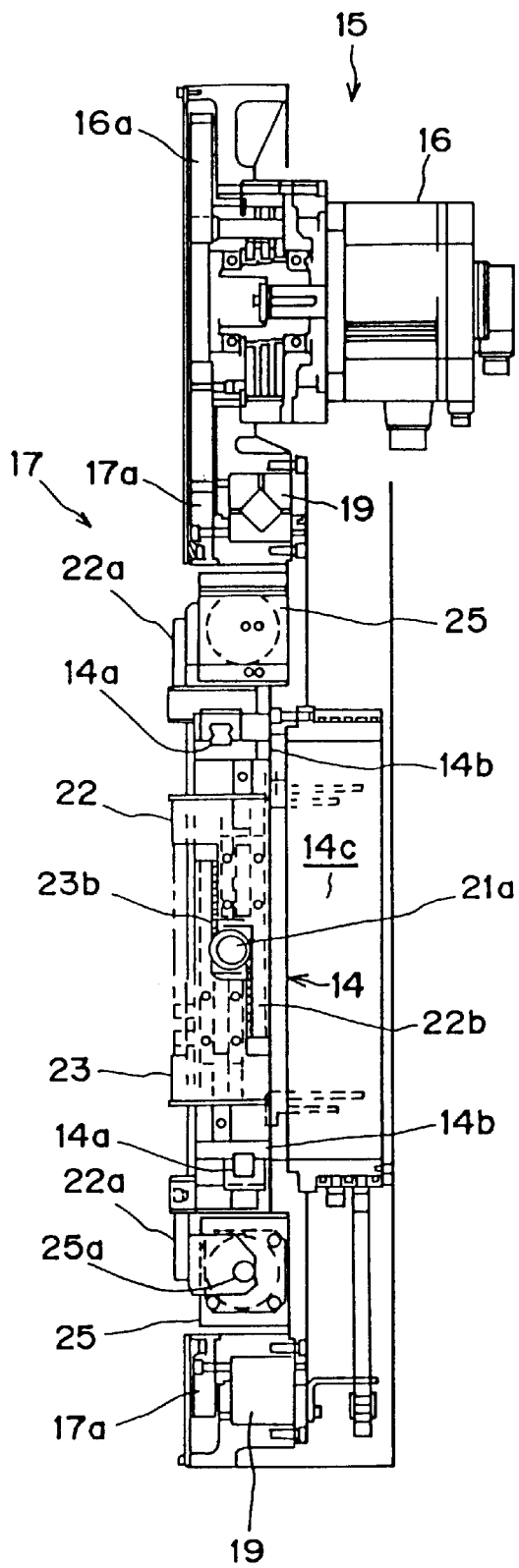
FIG. 16 is a side-view of FIG. 15.

As shown in FIG. 16, the rotation head 17 has a head body 14 rotatably supported by a bearing 19 with respect to the main body 15. A frame body 14b is provided with the central portion of the head body 14, forming a frame in the shape of a quadrangle as a whole. As shown in FIG. 16, guide rails 14a, 14a are provided with each side of the frame body 14b in the direction as shown by the arrows E and F in FIG. 15, enclosing the frame body 14b. Slidable plates 22, 23 are provided with the guide rails 14a, 14a of each side through a known straight line bearing means, such as a direct-acting guide unit, slidable in the direction as shown by the arrows E and F.

A bracket 22a is provided with the slidable plate 22. A driving cylinder 25 provided with the head body 14 is connected with the bracket 22a through a rod 25a movably and drivably provided in the direction as shown by the arrows E and F. As shown in FIGS. 14 and 16, racks 22b and 23b are formed so as to face each other on the respective slidable plates 22 and 23. A gear 21a, rotatably supported on the central portion of the respective sides of the frame body 14b, is engaged with the racks 22b and 23b.

Figure 17:
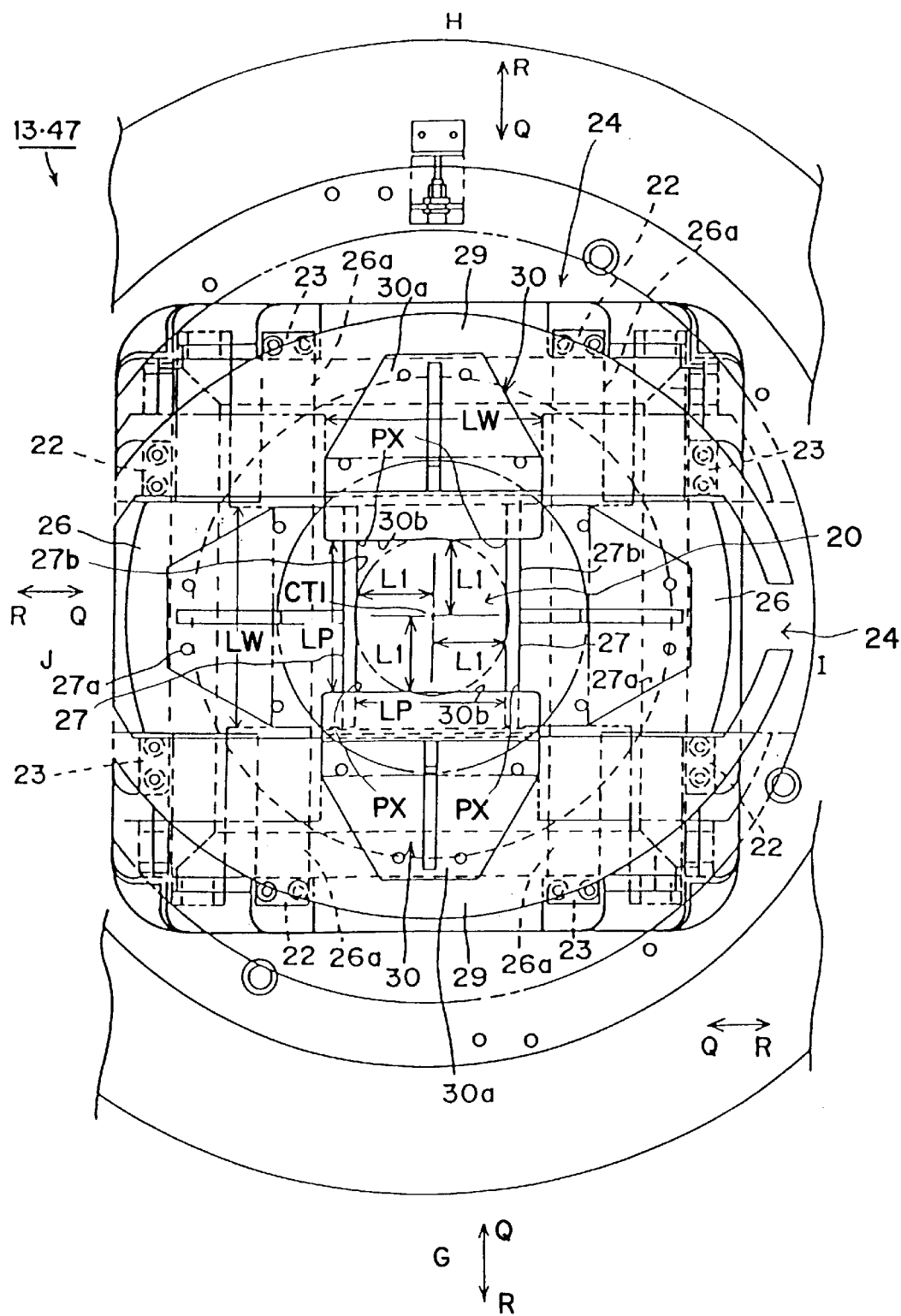
FIG. 17 is a front elevation of the first and the third chuck units.

As shown in FIG. 17, for the pair of the slidable plates 22 and 23 facing on G and H sides of FIG. 15 of the slidable plates 22 and 23 of the respective sides, connection plates 26, 26 formed in almost T shape are provided such that two pairs of slidable plates 22 and 23 respectively facing on G and H sides are connected with each other through arms 26a and 26a. A claw member 27 is attachably and detachably installed on each connection plate 26 through an installing portion 27a. As shown in FIG. 18, the claw member 27 is formed, projecting in the left direction in the figure in its top end. At the top end portion of the claw member 27, a holding portion 27b bent inside the head body 14 is formed. As shown in FIG. 17, the holding portions 27b of a pair of the claw members 27, which face each other placing an insertion portion 20 of a workpiece therebetween, are formed so as to face each other. Besides, the above-mentioned guide rails 14a, the slidable plates 22, 23, the racks 22b, 23b and the gear 21a are a synchronizing movement mechanism 24 for the connection plates 26, 26. By this synchronizing movement mechanism 24, the connection plates 26 and 26 are synchronously movable.

As shown in FIG. 17, for the pair of the slidable plates 22 and 23 facing on the I and J sides of FIG. 15 of the slidable plates 22 and 23 of the respective sides, connection plates 29, 29 formed in almost C shape are provided such that two pairs of slidable plates 22 and 23 respectively facing on the I and J sides are connected with each other. The respective connection plates 29 are provided, overlapping in the right and left direction in the figure on the left side of the connection plate 26 in the figure without interfering with the connection plate 26, as shown in FIG. 18. A claw member 30 is installed on each connection plate 29 through an installing portion 30a. As shown in FIG. 18, the claw member 30 is formed, projecting its top end in the left direction of the figure, and a holding portion 30b is formed at the top end of the claw member 30, being bent inside the head body 14. The holding portions 30b of a pair of the claw members 30 opposed placing the insertion portion 20 of the workpiece therebetween are formed, facing each other, as shown in FIG. 17. As shown in FIG. 18, the holding portion 30b of the claw member 30 is formed, being shifted in the left direction of the figure with respect to the holding portion 27b of the claw member 27. Then, the holding portions 27b and 30b of both claw members 27 and 30 are formed so as not to interfere with each other even if the claw members 27, 30 are made close to the central portion of the head body 14, as shown in FIG. 17. Besides, the guide rails 14a, the slidable plates 22, 23, the racks 22b, 23b and the gear 21a is the synchronous movement mechanism 24 for the connection plates 29, 29, and the connection plates 29, 29 are synchronously movable by the synchronous movement mechanism 24.

As mentioned before, the respective holding portions 27b, 30b are formed such that the projected form (FIG. 17) parallel to the axial center direction of the main body 15 (the central axis CT1) is substantially straight line. And, the claw members 27, 30 adjacent to each other are located free to intersect such that the projected form parallel to the axial direction of these holding portions 27b, 30b forms an intersectional portion PX (FIG. 17) by shifting the holding portions 27b, 30b in the axial center direction. Besides, the respective holding portions 27b, 30b are located so as to move to such a position that the distance LP (FIG. 17) between the intersectional portions PX, PX formed on both sides of the holding portions 27b, 30b in the projected form parallel to the axial center direction is smaller than the width LW of the holding portions 27b, 30b. On this occasion, the projected forms parallel to the axial center direction of the respective holding portions 27b, 30b are almost the same dimension.

As shown in FIG. 18, a hole 14c is formed on the head body 14 of the first chuck unit 13 inside the frame body 14b, and an actuator 14f is provided with the hole 14c so as to project and drive a rod 14g through a bracket 14d in the direction as shown by the arrows C and D of the figure which is the X-axis direction. On the top end of the rod 14g, a kick-out plate 14h is installed.

The machining portion 5 of FIG. 1 has a laser beam generator 31, and on the left hand of the laser beam generator 31, a machining head portion 32 is provided. A saddle 33 is provided with the machining head portion 32 so as to move, drive and position in the direction as shown by the arrows K and L which is the Y-axis direction, and a laser beam path tube 35 is extendably connected between the saddle 33 and the laser beam generator 31 so as to supply the saddle with laser beam output from the laser beam generator 31.

Figure 12:
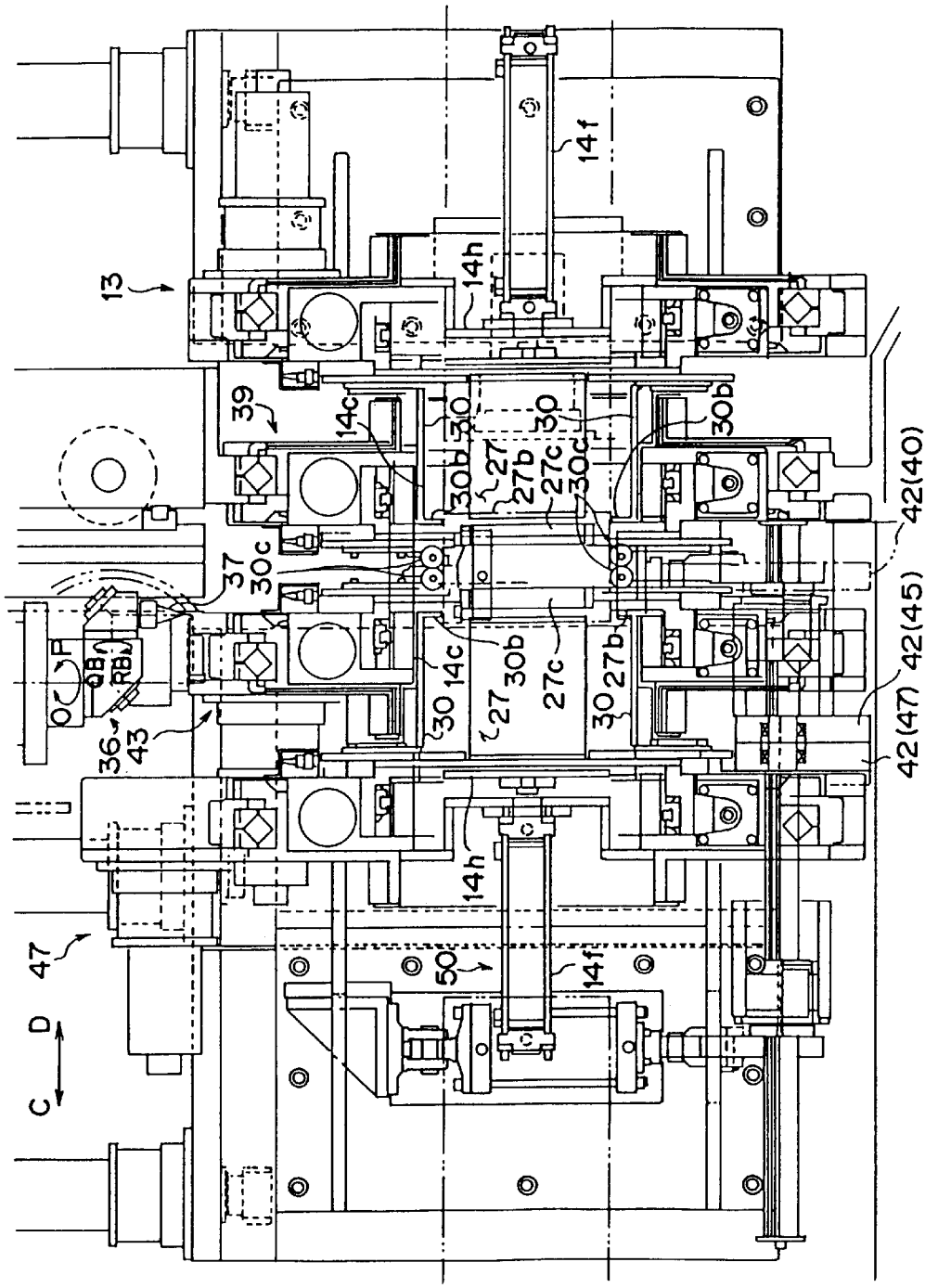
FIG. 12 is a front elevation of FIG. 11.

At the lower end of the saddle 33 of FIG. 1, a machining head 36 is provided so as to move, drive and position in the direction as shown by the arrows M and N which is the Z-axis direction, and a torch 37 is provided with the machining head 36 so as to rotate, drive and position in the direction as shown by the arrows 0 and P which is the A-axis direction and in the direction as shown by the arrows QB and RB which is the B-axis direction, as shown in FIG. 12.

Figure 4:
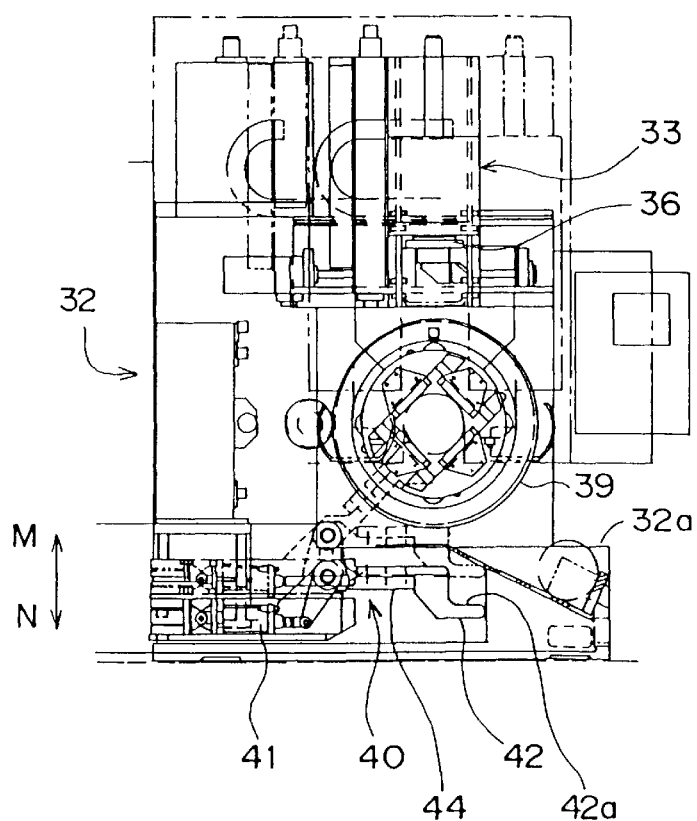
FIG. 4 is a side-view showing near a second chuck unit in the laser beam machine of FIG. 1.
Figure 11:
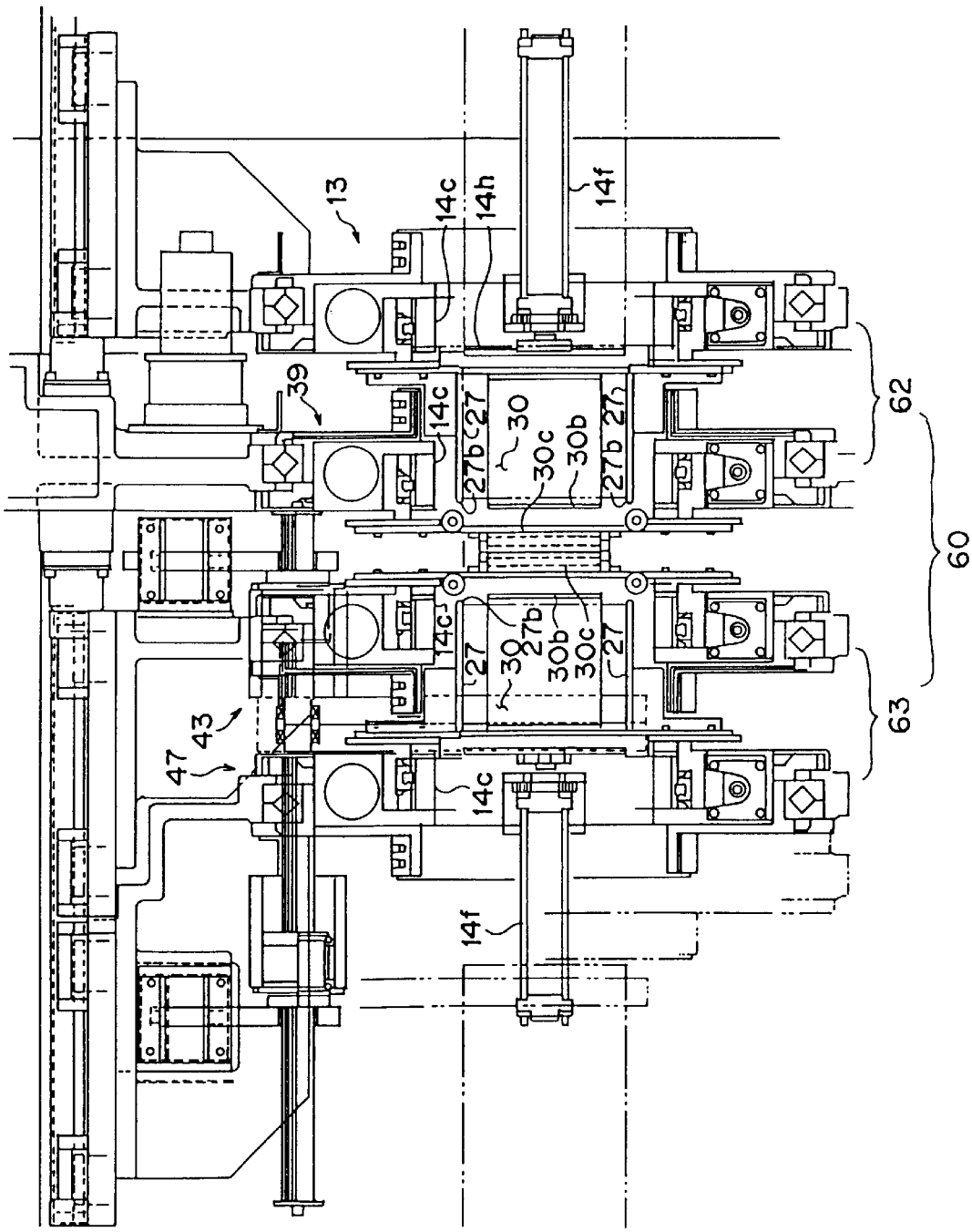
FIG. 11 is a plan showing the first through the fourth chuck units maximally approached one another.

As shown in FIG. 4, a second chuck unit 39 is fixedly provided with the machining head portion 32 so as to coaxially match with the first chuck unit 13 in the direction as shown by the arrows C and D which is the X-axis direction. The second chuck unit 39 has the structure almost similar to the first chuck unit 13. Therefore, the same marks are affixed to the portions the same as the first chuck unit 13, and the explanation concerning the same portions is omitted. As shown in FIG. 14, the different points between the second chuck unit 39 and the first chuck unit 13 are that in the second chuck unit 39, the hole 14c of the main body 15 penetrates, no actuator 14f is provided, and the holding portions of the claw member 27, 30 installed on the connection plates 26, 29 are rotatable roller holding portions 27c, 30c. In case of this second chuck unit 39, the claw members 27, 30 are located near an opening 14t on the left side of the paper of FIG. 14 of the hole 14c. On this occasion, the roller holding portions 27c and 30c are also provided, shifting its installation position in the right and left direction of the figure, that is, in the C and D direction so as not to interfere with each other, as shown in FIG. 14. The first and second chuck units 13, 39 above-explained comprises a set of a first chuck unit set 62 (FIG. 11).

A cut workpiece ejection portion 32a is formed on the left hand of FIG. 1 of the second chuck unit 39 of the machining head portion 32, as shown in FIG. 4, and between the cut workpiece ejection portion 32a and the second chuck unit 39, a first workpiece receiving unit 40 is provided so as to receive the workpiece held and cut by the second chuck unit 39. As shown in FIG. 4, the first workpiece receiving unit 40 has a receiving arm 42 provided so as to oscillate and drive between the second chuck unit 39 and the cut workpiece ejection portion 32a through an actuator 41 provided with the machining head portion 32 so as to go up and down in the direction as shown by the arrows M and N, and through a shaft 44 by the actuator 41. The receiving arm 42 has a workpiece storing portion 42a in the shape of L in its end.

On the left hand of FIG. 1 of the second chuck unit 39 in the machining head portion 32, guide rails 32b, 32b are formed being parallel in the direction as shown by the arrows C and D which is the X-axis direction. A third chuck unit 43 is provided with the guide rails 32b, 32b being free to move, drive and position on the guide rails 32b, 32b. The third chuck unit 43 is provided, being coaxial with the first and the second chuck units 13, 39, and the structure of its chuck part is the same as the second chuck unit 39. But, its arrangement is symmetric with respect to the second chuck unit 39, as shown in FIG. 12.

Figure 5:
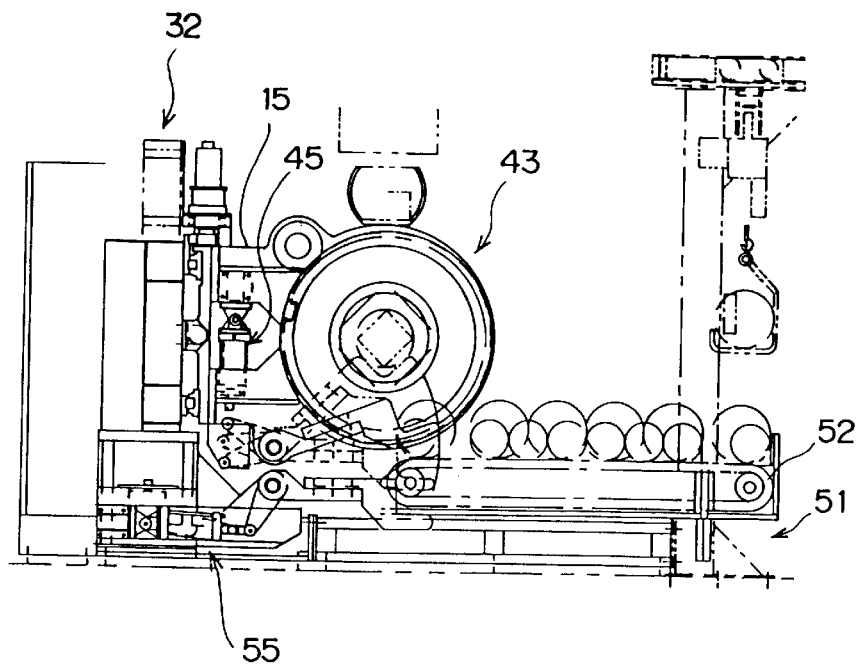
FIG. 5 is a side-view showing near a third chuck unit in the laser beam machine of FIG. 1.
Figure 8:
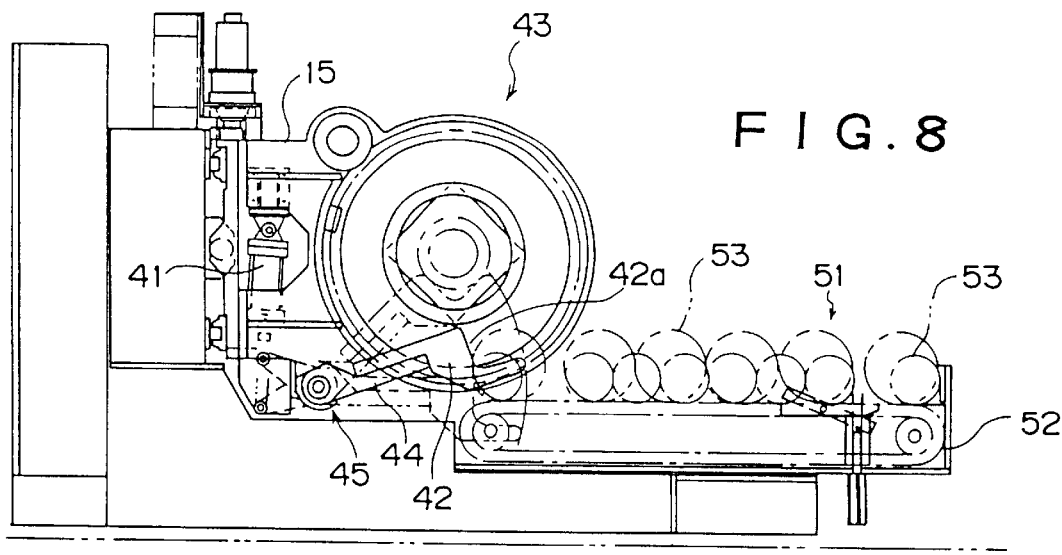
FIG. 8 is a side-view showing an example of the operation aspect of a workpiece receiving unit.

As shown in FIGS. 5 and 8, a second workpiece receiving unit 45 is provided with the main body 15 of the third chuck unit 43. The second workpiece receiving unit 45 has also almost similar structure to the first workpiece receiving unit 40 except that the attachment position of the actuator 41 is only different. Therefore, the same mark is affixed to the same portion as the first workpiece receiving unit 40, then the explanation of the corresponding parts is omitted.

Figure 9:
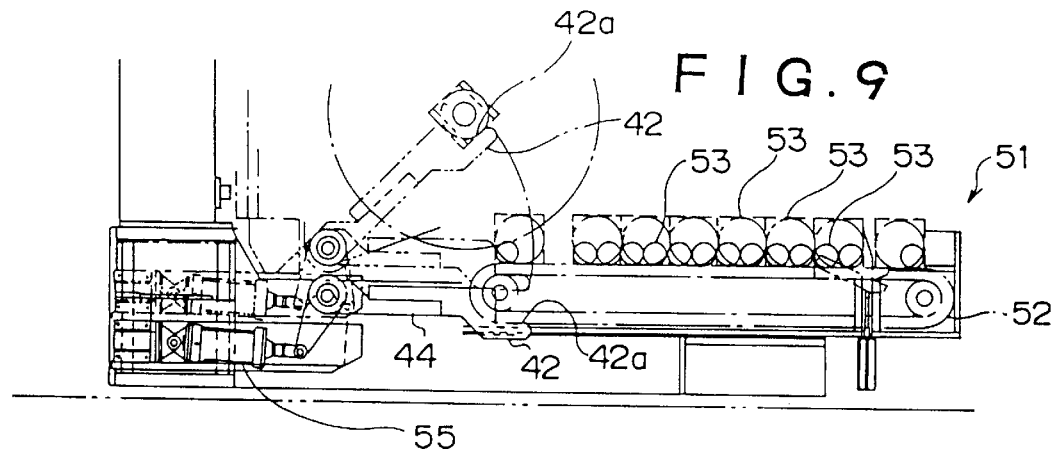
FIG. 9 is a side-view showing another example of the operation aspect of the workpiece receiving unit.
Figure 10:
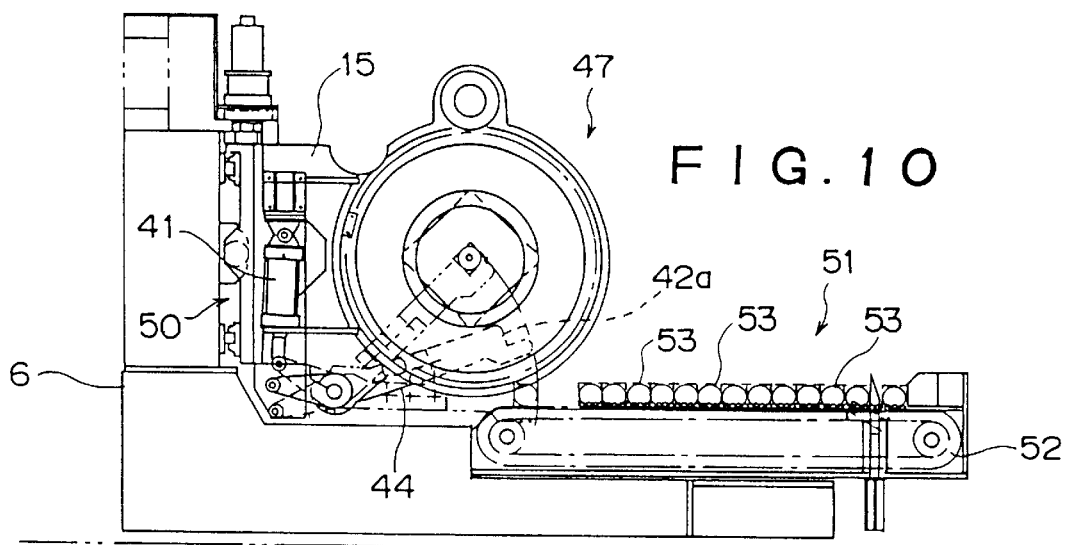
FIG. 10 is a side-view showing another example of the operation aspect of the workpiece receiving unit.

On the other hand, as shown in FIGS. 1 and 2, a fourth workpiece receiving unit 55 having the same structure as the first workpiece receiving unit 40 is provided with the rear workpiece feeder 6, as shown in FIG. 9. Furthermore, guide rails 46, 46 are provided with the rear workpiece feeder 6 on the machine body 2, being parallel in the direction as shown by the arrows C and D which is the X-axis direction. A fourth chuck unit 47 is provided with the guide rails 46, 46 so as to move, drive and position in the direction as shown by the arrows C and D which is the X-axis direction along the guide rails 46, 46. The fourth chuck unit 47 is provided, coaxially matching with the first through third chuck units 13, 39, 43 in the X-axis direction. The fourth chuck unit 47 is the same as the first chuck unit 13 in the structure of its chuck portion, but its arrangement is symmetric with respect to the first chuck unit 13, as shown in FIG. 12. The third and fourth chuck units 43, 47 as explained before comprises a set of second chuck unit sets 63, and this second chuck unit set 63 and the first chuck unit set 63 already explained comprises a raw material feeding apparatus 60 (FIG. 11).

Figure 6:
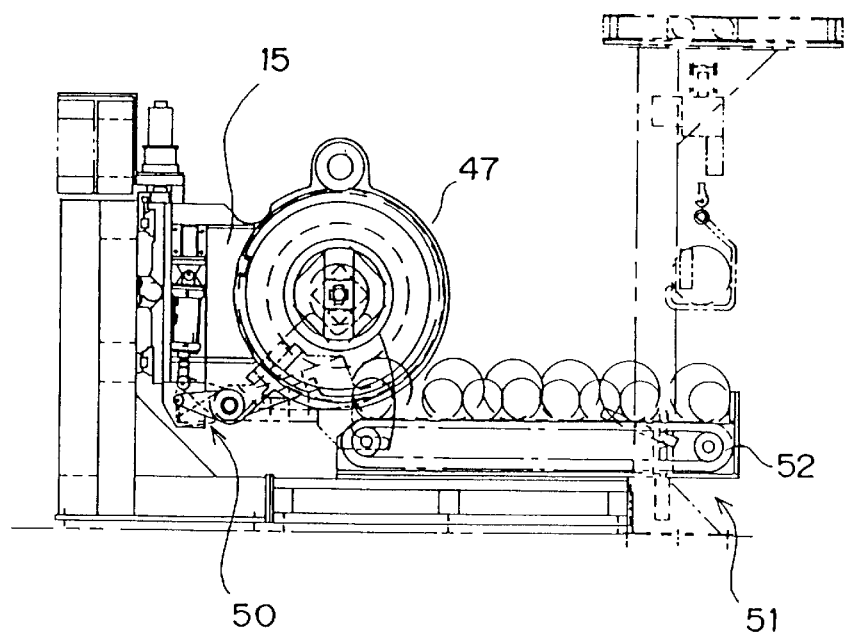
FIG. 6 is a side-view showing near a fourth chuck unit in the laser beam machine of FIG. 1.

As shown in FIGS. 6 and 16, a third workpiece receiving unit 50 similar to the second workpiece receiving unit 45 of the third chuck unit 43 is provided with the main body 15 of the fourth chuck unit 47. Therefore, the same mark is affixed to the same portion as the second workpiece receiving unit 45, then the explanation of the corresponding parts is omitted.

On the lower hand of FIG. 2 of the rear workpiece feeder 6, a workpiece ejection unit 51 is provided, and the workpiece ejection unit 51 has a plurality of conveyer units 52, as shown in FIGS. 2, 5 and 6.

The laser beam machining apparatus 1 has the structure as mentioned before. In order to machine so-called long-length member continuing the same section in the material axis direction, such as a pile, an angle, a shape steel with the laser beam machining apparatus 1, a long-length member to be machined is loaded on the conveyer unit 10 of the workpiece stock unit 7. Since the workpiece support 10a having corresponding member loading portion 10c is provided with the conveyer unit 10, corresponding to the sectional shape of a long-length member 53 to be machined, as shown in FIG. 19, the long-length member 53 to be machined is loaded on the corresponding workpiece support 10a. Next, the conveyer unit 10 is driven so as to feed the long-length member 53 loaded on each workpiece support 10a in the arrow A direction, as shown in FIG. 7. And, the movable carriage 9 is moved in the arrow B direction so as to move the workpiece delivery unit 11 on the conveyer unit 10 side. With the movement of the conveyer unit 10 in the direction as shown by the arrow A, the long-length member 53 loaded on the rightmost workpiece support 10a in the figure is loaded on the workpiece loading portion 11a of the workpiece delivery unit 11. As shown in FIG. 19, the shape of the workpiece loading portion 11a fitting to the sectional shape of the long-length member 53 is installed so as to use, as shown in FIG. 19.

In this state, the workpiece delivery unit 11 is moved in the direction as shown by the arrow A, and is moved on the upper hand of FIG. 7. And, the long-length member 53 loaded on the workpiece delivery unit 11 is positioned between the first chuck unit 13 and the second chuck unit 39. Next, the driving motors 16 of the first and the second chuck units 13 are rotated and driven, and the rotation head 17 is rotated with the central axis CT1 with its center with respect to the main body 15 through the gears 16a, 17a so as to position at a predetermined orient position (the standard angle position around the central axis CT1 which is the standard on the machining with the rotation head 17). Subsequently, all of the driving cylinders 25 of the respective rotation heads 17 is driven so as to retreat the rod 25a in the direction as shown by the arrow E. Then, all of the slidable plates 22 connected with the rod 25a through the bracket 22a is also moved in the direction as shown by the arrow E through the guide rail 14a, and the slidable plate 23 also starts to move through the racks 22b, 23b of the slidable plates 22, 23 and the gear 21a in the direction as shown by the arrow F, synchronizing with the slidable plate 22.

Then, two pairs of the claw members 27, 30 installed on two pairs of the slidable plates 22, 23 of the first chuck unit 13, facing each other through the connection plates 26, 29 are moved in the direction as shown by the arrow R of FIG. 18, that is, outside the radial direction with respect to the central axis CT1, and the holding portions 27b, 30b of the respective claw members 27, 30 are released. So, the first chuck unit 13 becomes to be in a released state.

In a similar way, the roller holding portions 27c, 30c of the claw members 27, 30 are moved in the direction as shown by the arrow R of FIG. 14, that is, outside the radial direction with respect to the central axis CT1 in the second chuck unit 39, and the roller holding portions 27c, 30c of the respective claw members 27, 30 are released, and then, the second chuck unit 13 becomes to be in a released state.

In this state, when the first chuck unit 13 is moved along the guide rail 12 in the direction as shown by the arrow C of FIG. 1, the right edge portion of the long-length member 53 loaded on the workpiece loading portion 11a of the workpiece delivery unit 11 is inserted among the four claw members 27, 30 in a released state, as shown in FIG. 17, of the first chuck unit 13 moved and driven in the direction as shown by the arrow C. Subsequently, in this state, the driving cylinder 25 of the first chuck unit 13 is driven in the direction opposite to the former so as to project the rod 25a in the direction as shown by the arrow F. Then, two pairs of the claw members 27, 30 installed on two pairs of the slidable plates 22, 23 facing each other through the connection plates 26, 29 are moved in the direction as shown by the arrow Q of FIG. 18, that is, inside the radial direction with respect to the central axis CT1, and the holding portions 27b, 30b of the respective claw members 27, 30 are also moved in the direction as shown by the arrow Q. Since in this movement, the respective slidable plates 22, 23 are synchronously moved and driven in the direction as shown by the arrow Q through the racks 22b, 23b and gear 21a, the claw members 27, 30 installed on the respective slidable plates 22, 23 are moved at the same speed in the central axis CT1 direction, always making the distance Li between the holding portions 27b, 30b of the respective claw members 27, 30 and the central axis CT1 equal as the whole first chuck unit 13, as shown in FIG. 17. Since the respective holding portions 27b, 30b are linearly formed, making right angle, as shown in FIG. 17, the long-length member 53 inserted into the head body 14a, enclosing the four sides by the holding portions 27b, 30b of the respective claw members 27, 30, is held, automatically centering its dimensional center with respect to the central axis CT1 by the respective holding portions 27b and 30b. This centering action is performed such that the central position of the square outside contacting with the sectional shape of the long-length member 53 corresponds with the central axis CT1.

When the reaction acting on the respective claw members 27, 30 facing each other from the long-length member 53 side reaches a predetermined value, the driving cylinders 25 corresponding to the pair of the respective claw members 27, 30 stop to drive. Therefore, the long-length member 53 can be held with proper holding force even if the long-length member 53 has a rectangular section and the movement quantity of the respective claw members 27, 30 in the direction as shown by the arrow Q is different from each other.

As mentioned before, the respective holding portions 27b, 30b can move at the position where the distance LP between the intersectional portions PX, PX formed on both sides of the holding portions 27b, 30b is smaller than the width LW of the holding portions 27b, 30b in the projected form parallel to the central axis CT1 direction. So, the projected form parallel to the central axis CT1 direction forms a closed ring, and a plurality of holding portions 27b, 30b can move, being free to enlarge and reduce the size of this closed ring. That is, the long-length member 53 inserted into the insertion portion 20 is enclosed by the closed ring with a plurality of holding portions 27b, 30b. Even if it is modified cross section shape, the closed ring enclosing the long-length member 53 is reduced so as to always make stable clamping condition with three or more points. That is, according to the first through the fourth chuck units of the present embodiments, the workpiece having modified cross section shape can be also properly clamped.

When the end portion of the long-length member 53 is held by the first chuck unit 13 in this way, the first chuck unit 13 is moved in the direction as shown by the arrow C of FIG. 1. At this time, the top end portion of the left hand in the figure of the long-length member 53 is inserted and penetrated into the hole 14c of the second chuck unit 39 having the roller holding portions 27c, 30c being in a released state so as to locate on the lower hand of the machining head 36 of the machining head portion 32.

In this state, the driving cylinder 25 of the second chuck unit 39 is moved and driven in the direction as shown by the arrow F of FIG. 15 in a similar way to the first chuck unit 13 so as to synchronously move the roller holding portions 27c, 30c in the direction as shown by the arrow Q of FIG. 13 at the equal speed in a similar way. Then, the top end portion of the long-length member 53 is held, being centered. When the long-length member 53 is held by the first and the second chuck units 13, 39, being centered, the workpiece loading portion 11a of the workpiece delivery unit 11 of FIG. 7 is dropped and the movable carriage 9 is retracted in the direction as shown by the arrow B. Next, the first chuck unit 39 is properly moved and driven in the direction as shown by the arrow C of FIG. 1 so as to feed the long-length member 53 held by the first and the second chuck units 13, 39 on the machining head portion 32 side. Then, the portion to be machined of the long-length member 53 is positioned at a predetermined machining position of the lower hand of the machining head 36.

On this occasion, the long-length member 53 is impossible to rotate with respect to the axial center CT1 by the roller holding portions 27c, 30c of the second chuck unit 39, but is supported, being movable in the direction as shown by the arrows C and D which is the X-axis direction. So, the long-length member 53 can be easily moved in the X-axis direction by moving and driving the first chuck unit 13 in the direction as shown by the arrow C, maintaining its centering state.

When the portion to be machined of the long-length member 53 is positioned at a predetermined machining position of the lower hand of the machining head 36, laser beam is supplied the machining head 36 through the laser beam generator 31 and the laser beam path tube 35, and laser beam is ejected to the long-length member 53 from the torch 37 so as to start cutting machining. The machining is performed in such a manner that the rotation heads 17, 17 of the first and the second chuck units 13, 39 are synchronously driven and rotated around the central axis CT1 by the driving motor 16 through a numerically controlled unit (not shown) on the basis of a predetermined machining program so as to drive and rotate the long-length member 53 around the X-axis (that is, the C-axis), being free to maintain the angle at an optional position, and the first chuck unit 13 is driven and moved in the direction as shown by the arrows C and D so as to drive and move the long-length member 53 in the direction as shown by the arrows C and D and in the C-axis direction, being fee to position and maintain at an optional position.

Besides, since the torch 37 is free to drive, move and position in the Y-axis direction which is the direction as shown by the arrows K and L, in the Z-axis direction which is the direction as shown by the arrows M and N, in the A-axis direction which is the direction as shown by the arrows O and P, in the B-axis direction which is the direction as shown by the arrows QB and RB, three dimensional solid machining can be easily performed on the long-length member 53, the same as the above-mentioned action of moving and driving of the long-length member 53.

When the cutting machining of the long-length member 53 with the torch 37 finishes, the cut workpiece is ejected to the cut workpiece ejection portion 32a by the workpiece storing portion 42a of the first workpiece receiving unit 40, as shown in FIG. 4. When the cut workpiece is ejected to the workpiece ejection portion 32a, the first chuck unit 13 is again driven and moved a predetermined quantity in the direction as shown by the arrow C, that is, in the machining head 36 direction, and the raw machining portion of the long-length member 53 is again fed from the second chuck unit 39 in the direction as shown by the arrow C, that is, on the machining head 36 side. Then, a predetermined machining is successively performed on the basis of the machining program by the torch 37.

In the above-mentioned case, the top end portion of the long-length workpiece 53 is cut, supporting the long-length member 53 by the first and the second chuck units 13, 39 on only one side so as to eject the machined workpiece to the workpiece ejection portion 32a provided on the lower hand of the machining head 36. But, with the laser beam machine 1, the long-length member 53 can be cut and machined between the chuck units 39 and 43 by the torch 37 in such a state that the long-length member 53 is held by the third chuck unit 43, and the fourth chuck unit 47 if necessary, and the long-length member 53 is supported by the chuck units 13, 39, 43, 47 of both sides of the machining apparatus, in addition to the above-mentioned machining method.

In this case, the third chuck unit 43 can be driven, moved and positioned in a predetermined distance bounds in the direction as shown by the arrows C and D, and the fourth chuck unit 47 can be driven, moved and positioned in almost whole length of the X-axis of the rear workpiece feeder 6. So, when the long-length member 53 is held, the third chuck unit 43 or the fourth chuck unit 47 is moved in the X-axis direction according to the length of the workpiece to be cut and machined from the long-length member 53, the first chuck unit 13 is moved and driven in the direction as shown by the arrow C in this state so as to project the long-length member 53 longer in comparison with the above-mentioned case in one side support state in the direction as shown by the arrow C, then, the long-length member 53 is held by the third chuck unit 43, and the fourth chuck unit 47 also, if necessary. Then, accurate machining can be executed on the long-length member 53 without bending by dead weight since it is held on both sides of the machining portion placing the torch 37 therebetween.

Since in the third chuck unit 43, the long-length member 53 is held by the roller holding portions 27c, 30c similar to the second chuck unit 39, the long-length member 53 can be held, free moving in the direction as shown by the arrows C and D, and the workpiece having an optional length can be easily cut and machined. Furthermore, the long-length member 53 can be easily machined, rotating and positioning at an optional angle position around the central axis CT1, and rotating at a predetermined angle speed by synchronously rotating and driving the respective rotation heads 17 of the first, the second, the third and the fourth chuck units 13, 39, 43, 47. Besides, the long-length member can be of course machined, slidably supporting by the second and the third chuck units 39, 43 by holding the long-length member by the first and the fourth chuck units 13, 47 in its both ends, and synchronously moving and driving the first and the fourth chuck units 13, 47 in the X-axis direction.

When the long-length member is fed, one end of the long-length member is fixedly held by the first chuck unit 13 (the fourth chuck unit 47) and the position near the center of the long-length member is movably (guided) supported by the second chuck unit 39 (the third chuck unit 43), as mentioned before. By doing so, automatic feeding of the long-length member can be properly performed without bending by its dead weight. Besides, since the claw members 27, 30 of the first chuck unit 13 (the fourth chuck unit 47) can be inserted into the hole 14c of the second chuck unit 39 (the third chuck unit 43), one end of the held long-length member can be inserted into this hole 14c, the utmost end portion can be also fed in the feeding direction. Then, the portion which can not be machined by holding is few, and the yield improves.

Besides, when a relatively long workpiece is cut out, the fourth chuck unit 47 is moved in the direction as shown by the arrow C, holding the workpiece cut by the torch 37 in such a state that the third chuck unit 43 is released, and the cut workpiece is moved on the second, the third and the fourth workpiece receiving units 45, 50, 55 being in oscillating and driving state in the central axis CT1 direction in advance after the end portion of the cut workpiece is out of from the third chuck unit 43 in the direction as shown by the arrow C.

Furthermore, in this state, the holding portions 27b 30b of the fourth chuck unit 47 are released, and the actuator 14f of the fourth chuck unit 47 is driven so as to project the kick-out plate 14h. Then, the workpiece is loaded on the second, the third and the fourth workpiece receiving units 45, 50, and 55. And, the second, the third and the fourth workpiece receiving units 45, 50, 55 are oscillated on the lower hand as shown in FIGS. 5 and 6 so as to load the cut workpiece on the conveyer unit 52 of the workpiece ejection unit 51. The cut workpiece loaded on the conveyer unit 52 is properly carried outside by the conveyer unit 52 and manual operation.

On this occasion, the feeding of the long-length member 53 to the machining head portion 32 is mainly performed by the first and the second chuck units 13, 39 and the ejection of the cut workpiece out of the machining head portion 32 is mainly performed by the third and the fourth chuck units 43, 47. But, in the second and the third chuck units 39, 43 of the machining head portion 32 side, their roller holding portions 30c, 30c can be abutted on and contacted with each other in such a state that the third chuck unit 43 is moved on the right hand to the utmost in the figure, as shown in FIGS. 11 and 12. Then, the top end portion of the long-length member 53 held on the second chuck unit 39 side can be held by the third chuck unit 43 with minimum projected length. Even if end machining is performed by holding the cut workpiece on the third chuck unit 43 side when the long-length member 53 is short cut in the X-axis direction, the workpiece can be certainly held.

Besides, as shown in FIGS. 11 and 12, the claw members 27, 30 of the first and the fourth chuck units 13, 47 can be inserted into the hole 14c of the rotation head 17 of the second and the third chuck units 39, 43, and the holding portions 27b, 30b of their top end portions can reach near the roller holding portions 27c, 30c of the second and the third chuck units 39, 43. Then, when the machining is performed by the machining head 36, holding by the first and the fourth chuck units 13, 47, the portion to be held by machining can be made minimum, and the machining is possible, strictly restricting vain cut remaining portion. Then, the yield of material can be improved.

On this occasion, the rest material of the long-length member 53 remaining lastly on the first chuck unit 13 or the fourth chuck unit 47 side can be smoothly ejected outside the chuck units 13, 47 by making the claw members 27, 30 in the released state and driving the actuator 14f so as to project the kick-out plate 14h in the direction as shown by the arrow C or D of FIG. 17.

The above-mentioned embodiment relates to the laser beam machine as a three-dimensional linear machining apparatus. But, various kinds of the three-dimensional linear machining apparatus, such as a plasma cutting machine and a gas cutting machine, can be used as a three-dimensional linear machining apparatus as long as material can be linearly cut and machined, in addition to a laser beam machine.

Furthermore, in the above-mentioned laser beam machine 1, the torch 37 of the machining head 36 has four control axes structure of Y-axis, Z-axis, A-axis and B-axis, the first chuck unit 13, the third chuck unit 43, and the fourth chuck unit 47 has two control axes structure of X-axis and C-axis, and the second chuck unit 39 has one control axis structure of C-axis. But, any control axis structure as a whole machine is available as long as free curved face shape machining by the machining head 36 is possible.

In the above-mentioned embodiment, four clamping members comprised of the connection plate 26 (29) and the claw member 27 (30) are provided. But, this number is not limited to four. For instance, three, five or more clamping members can be provided so as to comprise a clamping unit.

In the above-mentioned embodiment, the width LW of the holding portions 27b, 30b (the roller holding portions 27c, 30c) is all same dimension. But, this width is not always same dimension. Furthermore, the second chuck unit 39 may be moved in the directions as shown by the arrows C and D.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Three-dimensional linear machining apparatus having a machining head portion providing a machining head capable of linearly machining a long-length member along its free curved face form, and a first raw material feeding apparatus for feeding a long-length member in a first direction to said machining head portion, said three-dimensional linear machining apparatus performing a three-dimensional linear machining on a long-length member supplied to said machining head portion by said raw material feeding apparatus on the basis of a machining program, said three-dimensional linear machining apparatus further comprising:

said first raw material feeding apparatus having a first and a second long-length member holding means;

a first holding portion for fixedly holding an end portion of said long-length member in said first direction provided at said first long-length member holding means;

said first holding portion having a plurality of holding members being free to open and close in a radial direction;

said second long-length member holding means provided on said machining head portion side rather than said first long-length member holding means;

a through hole through which said long-length member can pass and a second holding portion for movably holding said long-length member in said first direction in said through hole, both formed on said second long-length member holding means;

said second holding portion having a plurality of holding members being free to open and close in a radial direction; and said first and second long-length member holding means provided free to be relatively close to and be relatively apart from each other in said first direction; and said three-dimensional linear machining apparatus having such a characteristic wherein said long-length member which said end portion is fixed by said first long-length member holding means can be moved to said machining head portion side in said through hole, being held by said second holding portion of said second long-length holding means.

2. The three-dimensional linear machining apparatus as set forth in claim 1 wherein a second raw material feeding apparatus is provided on the opposite side of said first raw material feeding apparatus of said machining head portion, said second raw material feeding apparatus has a third and a fourth long-length member holding means, said third long-length member holding means is provided on said machining head portion side rather than said fourth long-length member holding means, a through hole through which said long-length member can pass and a holding portion for movably holding said long-length member in said first direction are formed on said third long-length member holding means, a holding portion for fixedly holding said long-length member in said first direction is provided with said fourth long-length member holding means, and said third and fourth long-length member holding means are provided free to be relatively close to and be relatively apart from each other in said first direction.

3. The three-dimensional linear machining apparatus as set forth in claim 1 wherein said long-length member holding means is rotatably and drivably provided in such a state that said holding portion can be controlled in its rotational angle, and can be rotated and driven in such a state that said long-length member is held by said holding portion.

4. The three-dimensional linear machining apparatus as set forth in claim 3 wherein said holding portion is provided so as to rotate and drive, synchronizing with said holding portion of another long-length member holding means.

5. The three-dimensional linear machining apparatus as set forth in claim 1 wherein a member centering means is provided with said holding portion.

6. The three-dimensional linear machining apparatus as set forth in claim 2 wherein said second and third long-length member holding means are provided so as to be relatively close to and relatively apart from each other in said first direction, and said holding portions of both can abut on each other at the time both are the most close to each other.

7. Clamping apparatus for a machine tool which is a clamping apparatus for clamping a workpiece when said workpiece is machined with a machine tool, having an apparatus body, a workpiece insertion portion capable of inserting a workpiece in an axial center direction of said apparatus body formed on said apparatus body, and three or more clamping members provided at the periphery of said workpiece insertion portion so as to synchronously move in a radial direction through a synchronous movement mechanism, and a workpiece abutting portion formed on said each clamping member, facing said workpiece insertion portion, said clamping apparatus for a machine tool further comprising:

said workpiece abutting portion formed such that projected form parallel to said axial center direction becomes to be substantially straight line;

said clamping members adjacent to each other located so as to cross such that said projected forms parallel to said axial center direction of these workpiece abutting portions form an intersectional portion by shifting said workpiece abutting portions in said axial center direction; and said each workpiece abutting portion located so as to move to such a position that the distance between said intersectional portions formed on both sides of said workpiece abutting portion in the projected form parallel to said axial center direction is smaller than the width of said workpiece abutting portion.

8. The clamping apparatus for a machine tool as set forth in claim 7 wherein said workpiece abutting portion is a claw portion formed, projecting for said workpiece insertion portion.

9. The clamping apparatus for a machine tool as set forth in claim 7 wherein said workpiece abutting portion is formed by a rotatable roller.

10. The clamping apparatus for a machine tool as set forth in claim 7 wherein a driving means for moving and driving said clamping members through said synchronous movement mechanism is provided, and said driving means has a function of maintaining a constant driving force.

11. Raw material feeding apparatus for feeding machining raw material in a feeding direction, comprising:

a raw material holding means set having a first raw material holding means and a second raw material holding means, both located in said feeding direction;

said first raw material holding means having a first holding portion for fixedly holding an end portion of said machining raw material in said feeding direction;

said first holding portion having a plurality of holding members being free to open and close in a radial direction;

said second raw material holding means having a through hole formed so as to penetrate said machining raw material and a second holding portion for movably holding said machining raw material in said feeding direction in said through hole;

said second holding portion having a plurality of holding members being free to open and close in a radial direction; and said first and said second raw material holding means provided so as to be relatively close to and relatively apart from each other in said feeding direction, and said raw material feeding apparatus having such a characteristic wherein said machining raw material which said end portion is fixed by said first raw material holding means can be moved to said feeding direction side in said through hole, being held by said second holding portion of said second raw material holding means.

12. The raw material feeding apparatus as set forth in claim 11 wherein two sets of said raw material holding means set are provided in said feeding direction, and these raw material holding means sets are symmetrically located in said feeding direction by facing the sides of said second raw material holding means each other.

13. The raw material feeding apparatus as set forth in claim 11 wherein said first holding portion is formed in a claw shape, and said second holding portion is a rotatable roller.

14. The raw material feeding apparatus as set forth in claim 12 wherein said two first holding portions are rotatably and drivably provided, being synchronous in such a state that rotational angle can be controlled in said two sets of raw material holding means sets.

15. The raw material feeding apparatus as set forth in claim 11 wherein a machining raw material supply means, capable of supplying a machining raw material between said first raw material holding means and said second raw material holding means in a direction intersecting with said feeding direction, is provided with said raw material holding means set.

16. Raw material feeding apparatus for feeding machining raw material in a feeding direction, comprising:

a raw material holding means set having a first raw material holding means and a second raw material holding means, both located in said feeding direction;

said first raw material holding means having a first holding means body, and a first holding portion, formed projecting on said second raw material holding means side with respect to said first holding means body, for fixedly holding said end portion of said machining raw material in said feeding direction;

said first holding portion having a plurality of holding members being free to open and close in a radial direction;

said second raw material holding means having a second holding means body, a through hole capable of inserting said first holding portion, formed on said second holding means body so as to penetrate, and a second holding portion for movably holding said machining raw material in said feeding direction in said through hole; and said second holding portion having a plurality of holding members being free to open and close in a radial direction; and said first and second raw material holding means provided so as to be relatively close to and relatively apart from each other in said feeding direction, and said raw material feeding apparatus having such a characteristic wherein said machining raw material which said end portion is fixed by said first raw material holding means can be moved to said feeding direction side in said through hole, being held by said second holding portion of said second raw material holding means.

17. The raw material feeding apparatus as set forth in claim 16 wherein said second holding portion is located near an opening of the back side of said first raw material holding means of said through hole.

18. The raw material feeding apparatus as set forth in claim 16 wherein said first holding portion is formed so as to be adjacent to said second holding portion in said feeding direction at the time of insertion into said through hole.

19. The raw material feeding apparatus as set forth in claim 16 wherein said first holding portion is formed in a claw shape, and said second holding portion is rotatable roller.

20. The raw material feeding apparatus as set forth in claim 16 wherein two sets of said raw material holding means sets are provided in said feeding direction, and the sides of said second raw material holding means are located, facing each other.

* * * * *